United States Patent
Takeda et al.

(10) Patent No.: US 7,328,009 B2
(45) Date of Patent: Feb. 5, 2008

(54) METHOD AND APPARATUS FOR MOBILE COMMUNICATION UTILIZING LOAD BALANCING

(75) Inventors: Yukiko Takeda, Tokorozawa (JP); Hidenori Inouchi, Higashimurayama (JP); Takehiro Morishige, Hachioji (JP); Koh Ohnishi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1119 days.

(21) Appl. No.: 10/606,259

(22) Filed: Jun. 26, 2003

(65) Prior Publication Data
US 2004/0063402 A1    Apr. 1, 2004

(30) Foreign Application Priority Data
Sep. 26, 2002  (JP) .............................. 2002-280154

(51) Int. Cl.
*H04Q 7/20* (2006.01)
(52) U.S. Cl. ................ 455/424; 455/432.1; 455/435.1; 455/446; 455/560; 709/219; 709/228
(58) Field of Classification Search ............. 455/414.1, 455/420, 422.1, 424, 432.1, 433, 446, 435.1, 455/517, 520, 560, 550.1; 709/201, 203, 709/219, 228–229
See application file for complete search history.

(56) References Cited

U.S. PATENT DOCUMENTS 7,120,131 B2 * 10/2006 Seppala et al. ............. 370/310

2002/0039367 A1 *  4/2002  Seppala et al. ............. 370/401
2002/0067704 A1     6/2002  Ton
2004/0152439 A1 *  8/2004  Kimura et al. ............. 455/403
2005/0010653 A1 *  1/2005  McCanne .................... 709/219
2005/0018632 A1 *  1/2005  Lee et al. .................... 370/329
2007/0038610 A1 *  2/2007  Omoigui ........................ 707/3

OTHER PUBLICATIONS

R. Hinden, "IP Version 6 Addressing Architecture", Hinden & Deering Standards Track, Jul. 1998, pp. 1-26.

* cited by examiner

*Primary Examiner*—Binh K. Tieu
(74) *Attorney, Agent, or Firm*—Reed Smith L.L.P.; Stanley P. Fisher, Esq.; Juan Carlos A. Marquez, Esq.

(57) ABSTRACT

A method and apparatus are provided for mobile communication utilizing load balancing. When a home agent (HA) consists of one or more servers with each server being assigned a Mobile IPv6 Home-Agents Anycast Address, a nearby router does not store the link-layer addresses with respect to the Anycast addresses of the servers in its neighbor cache. Consequently, load balancing between or among the servers could not be performed. To solve this problem, in one example, an HA is provided that comprises a representative HA and distributed HAs. The representative HA is assigned an Anycast Address. The representative HA includes a collecting device configured to collect HA lists and load information from the distributed HAs. The representative HA dynamically creates a HA list and sends the HA list to a mobile node (MN). The MN registers its current location with an HA from the HA list included in a Home Agent Address Discovery Reply message. The load on the HA can then be shared by the servers constituting the HA.

14 Claims, 29 Drawing Sheets

◎ : ANYCAST ADDRESS

S1 NEIGHBOR SOLICITATION MESSAGE FORMAT

S2 NEIGHBOR ADVERTISEMENT MESSAGE FORMAT

S3 HOME AGENT ADDRESS DISCOVERY REQUEST MESSAGE FORMAT

FIG. 7

S4 HOME AGENT ADDRESS DISCOVERY REPLY
MESSAGE FORMAT

| TYPE | CODE (0) | CHECKSUM |
|---|---|---|
| IDENTIFIER | | RESERVED |
| RESERVED | | |
| HOME AGENT ADDRESSES | | |

IPv6 ICMP
411

S5 ROUTER ADVERTISEMENT MESSAGE FORMAT

S21 LOAD INFORMATION COLLECTION REQUEST MESSAGE FORMAT

S22 LOAD INFORMATION COLLECTION RESPONSE MESSAGE FORMAT

FIG. 14

310 NEIGHBOR CACHE MANAGEMENT TABLE

| IP ADDRESS | LINK-LAYER ADDRESS | FLAG | |
|---|---|---|---|
| fec0:0:0:8200:fdff:ffff:ffff:fffe | 00:60:97:bb:f2:1e | | |
| | | | |
| | | | |

320 BINDING CACHE MANAGEMENT TABLE

| HOME ADDRESS (321) | CARE OF ADDRESS (322) | LIFETIME (323) | FLAG (324) | SEQUENCE NUMBER (325) | |
|---|---|---|---|---|---|
| | | | | | 320-1 |
| | | | | | 320-2 |
| | | | | | 320-n |

FIG. 16

330 HA LIST TABLE

| HA LINK-LOCAL ADDRESS (331) | HA GLOBAL ADDRESS (332) | HA PREFERENCE (333) | REMAINING LIFETIME (334) | |
|---|---|---|---|---|
| | | | | 330-1 |
| | | | | 330-2 |
| | | | | 330-n |

FIG. 17

340 NOTIFICATION INFORMATION MANAGEMENT TABLE

| IP ADDRESS | HA LIST | |
|---|---|---|
| | | |
| | | |
| | | |

350 HA LOAD INFORMATION MANAGEMENT TABLE
(DISTRIBUTED HA)

| DISTRIBUTED HA ADDRESS | NUMBER OF BC ENTRIES | NUMBER OF TRANSMITTED PACKETS | NUMBER OF RECEIVED PACKETS |
|---|---|---|---|
| | | | |
| | | | |
| | | | |

360 HA LOAD INFORMATION MANAGEMENT TABLE
(REPRESENTATIVE HA)

| 361 | 362 | 363 | 364 |
|---|---|---|---|
| DISTRIBUTED HA ADDRESS | NUMBER OF BC ENTRIES | NUMBER OF TRANSMITTED PACKETS | NUMBER OF RECEIVED PACKETS |
|  |  |  |  |
|  |  |  |  |
|  |  |  |  |

370 BC INFORMATION MANAGEMENT TABLE
 (REPRESENTATIVE HA)

| HOME ADDRESS (371) | CARE OF ADDRESS (372) | LIFETIME (373) | DISTRIBUTED HA ADDRESS (374) | |
|---|---|---|---|---|
| | | | | 370-1 |
| | | | | 370-2 |
| | | | | 370-n |

◎ : ANYCAST ADDRESS

METHOD AND APPARATUS FOR MOBILE COMMUNICATION UTILIZING LOAD BALANCING

BACKGROUND OF THE INVENTION

1. Field of the Invention

The present invention generally relates to equipment which provides mobile communication, and more particularly, to mobile communication equipment and a mobile communication method by which load balancing is accomplished using an IPv6 Anycast Address scheme.

2. Discussion of Background

In recent years, the operation of mobile communication networks under Internet Protocol (IP) has been examined actively. Standardizing Mobile IPv6 specifications is underway by the Internet Engineering Task Force (IETF) (Ref. Mobility Support in IPv6 <draft-ietf-mobileiip-ipv6-18.txt>, Work in Progress).

Primary constituents of a network of Mobile IPv6 are a Mobile Node (MN), Home Agent (HA), and Correspondent Node (CN). The MN is assigned a unique IP address (home address) that remains unchanged as it moves. A link that has the same prefix as the home address is called a home link. One or more HAs can be placed on a home link. If a plurality of HAs exist on a same link, the HAs exchange information such as HA addresses and preferences in order to hold a list of the HAs on the link. For the information exchange, Router Advertisement messages are used.

When the MN moves to a link outside the home link, it gets its IP address on the foreign link. This address is called a Care of Address (hereinafter referred to as CoA). The MN receives router advertisement messages which are periodically transmitted by a router installed on the foreign link. By detecting a prefix that differs from the home address, the MN finds itself moved away from home.

When the MN finds itself moved away from home, it registers its current location with an HA. The MN is provided with a Home Agent Address Discovery function and capable of dynamically searching for the IP address of an HA.

The MN creates a Mobile IPv6 Home-Agents Anycast Address from the prefix of the home link. The MN sends an ICMP Home Agent Address Discovery Request message to the above address. The above message is transmitted to any HA on the home link. An HA that received the above message sends back an ICMP Home Agent Address Discovery Reply message including the HA information to the MN. By extracting the HA information from the above message, the MN gets the address of the HA. The MN carries out a Binding Update message to register its current location to the HA address it acquired.

Having received the Binding Update message, the HA stores the home address of the MN and binding information associated with the CoA to the Binding Cache. Then, the HA multicasts Gratuitous Neighbor Advertisement messages in order to capture a packet addressed to the above MN and operates as proxy for the above MN.

The CN is the correspondent node communicating with the MN.

A procedure in which the CN sends a packet to the MN will be described below.

The CN sends a packet to the home address of the MN. The HA captures the packet addressed to the home address of the MN. The HA searches the Binding Cache and gets a CoA associated with the home address of the MN. The HA attaches an IP header addressed to the CoA to the received packet (encapsulation) and sends the packet to the CoA.

When the MN receives the above packet addressed to the CoA, it detaches the previously attached IP header (decapsulation) so that the original packet is restored.

An address scheme of IPv6 is specified in RFC2373. In the address scheme of IPv6, three types are defined: unicast, anycast, and multicast. An anycast address designates a group of interfaces. A packet with an anycast address set for its destination address is sent to the nearest interface in the group of interfaces having the anycast address. As an example of anycast address usage, the above-mentioned Home Agent Address Discovery function of Mobile IP uses this address type.

When resolving a link-layer address associated with an anycast address, an IPv6 node sends Neighbor Solicitation messages to the multicast address of its neighboring nodes. A node that received the Neighbor Solicitation message, if its address is set for the target address parameter in this message, sends a Neighbor Advertisement message. In the Neighbor Advertisement message to an anycast address, an override flag is not set.

Area A and area B are interconnected and, when a mobile node (MN) falling within area A has moved to area B, an HA existing in area A and retaining the location information on the mobile node operates as proxy for the MN.

In some implementation, the HA consists of one or more servers and the load for MN location registration and packet forwarding is shared by the servers. In this case, it can be assumed that the servers are assigned a Mobile IPv6 Home-Agents Anycast Address.

When a router near to the HA receives a packet addressed to a Mobile IPv6 Home-Agents Anycast Address having the prefix of the HA, it searches the Neighbor Cache for the above Anycast Address. If the above Anycast Address does not exist in the Neighbor Cache, the nearby router sends Neighbor Solicitation messages to the neighboring nodes in order to resolve a link-layer address. The Neighbor Solicitation messages include the above Anycast Address in the target address field. The servers constituting the HA send back Neighbor Advertisement messages in reply to the Neighbor Solicitation message.

However, in the Neighbor Advertisement messages to the anycast address, an override flag is not set. Thus, the nearby router registers the link-layer address information for the server that first replied to the Neighbor Solicitation message into the Neighbor Cache. Consequently, the nearby router forwards the Home Agent Address Discovery Request message transmitted from the MN to the particular server registered in the Neighbor Cache. The MN receives a Home Agent Address Discovery Reply message including the HA information from the particular server. Because the MN registers its current location with the HA, based on the received information, MN location registration is concentrated on the particular server. Unfortunately, when the HA consists of one or more servers, a problem arises that the load for MN location registration and packet forwarding cannot be shared by the servers.

SUMMARY OF THE INVENTION

It is an object of the present invention to provide mobile communication equipment and a mobile communication method which equalize and decentralize server loads efficiently when the HA consists of one or more servers. Particularly, the object is to provide mobile communication equipment and a mobile communication method which perform the following. When the HA existing in area A consists of one or more server, and when a mobile terminal y falling within area A has moved to area B, by changing the HA address to be communicated to the mobile terminal y through good use of the Mobile IPv6 Home-Agents Anycast Address scheme, the load is shared by the HA servers existing in area A.

It is another object of the present invention to provide mobile communication equipment in which the number of servers can be increased or decreased without influence on mobile nodes.

The present invention relates to a mobile communication equipment (HA 1) comprising a plurality of servers. The HA 1 consists of a server (representative HA) provided with a representative function and servers (distributed HAs) which perform the tasks of MN location registration and packet forwarding. The representative HA includes collecting device configured to collect HA list information and load information from the distributed HAs and a listing configured to dynamically generate an HA list. By assigning a Mobile IPv6 Home-Agents Anycast Address to the representative HA, the HA load can be shared by the servers constituting the HA without installing a load balancing device in the HA.

The representative HA 11 retains information on the source address of a Home Agent Address Discovery Request message and the HA list sent to that address in a set. Consequently, when the MN transmits the Home Agent Address Discovery Request message twice or more times, the same HA list can be sent to the sender of this message.

Alternatively, the representative HA includes retrieving device configured to get Binding Cache from the distributed HAs and retains Binding Cache copies. Consequently, when the MN repeats transmission of a Home Agent Address Discovery Request message, the HA can notify the MN of the address of the distributed HA 12 that retains the Binding Cache.

When the HA 1 accommodates a plurality of home networks, a plurality of Mobile IPv6 Home-Agents Anycast Addresses are assigned to the interface of its representative HA. Alternatively, a representative HA and distributed HAs are deployed for each home network and a Mobile IPv6 Home-Agents Anycast Address including the subnet prefix of the home network is assigned to the interface of the representative HA. In the HA 1, its load can be shared and the system expandability is enhanced.

When the HA 1 accommodates a plurality of home networks and each server is deployed to accommodate a single home network, by assigning a Mobile IPv6 Home-Agents Anycast Address of each home network to the interface of each server, the HA 1 can accommodate a plurality of home networks and the system expandability is enhanced.

The reliability of the HA 1 can be enhanced by duplicating its representative HA. When representative HA switching occurs, the Mobile IPv6 Home-Agents Anycast Address assigned to the interface of an active representative HA is reassigned to a standby representative HA.

In order to solve the above-mentioned problem, in the present invention, in addition to the mobile communication method of prior art, the following apparatuses are provided.

(1) Mobile communication equipment (HA) consists of one or more servers. The mobile communication equipment is provided with a representative function and distributed functions. A server with the representative function includes a collective device for collecting HA information and load information from servers with a distributed function and a listing device configured to generate an HA list, based on the thus collected information. To the interface of the server with the representative function, a Mobile IPv6 Home-Agents Anycast Address is assigned.

(2) Mobile terminal equipment (MN) transmits a Home Agent Address Discovery Request message to the Mobile IPv6 Home-Agents Anycast Address. The server with the representative function receives the above Home Agent Address Discovery Request message. The server with the representative function includes a listing device configured to create an HA list and sending the HA list to the MN.

(3) Furthermore, the server with the representative function includes a storing device configured to for store a set of entries, the source address of a Home Agent Address Discovery Request message and the HA list sent to that address. Upon having received another Home Agent Address Discovery Request message from the same sender, the server with the representative function may refer to the set of entries and send the HA list information to the sender of the above message.

Alternatively, the server with the representative function includes a collecting device configured to for collect terminal's location information from the servers with the distributed function and a storing device configured to store a set of entries, the location information and the address of a server with the distributed function. Upon having received another Home Agent Address Discovery Request message from the same sender, the server with the representative function may refer to the set of entries and send the information for the server with the distributed function to the sender.

(4) Furthermore, one or more servers with the distributed function may form a group and each group may be deployed for a home network. Alternatively, one server may be deployed to accommodate one or more home network. To the interface of the server with the representative function, a Mobile IPv6 Home-Agents Anycast Address of the home network is assigned.

Each home network is constituted of a server with the representative function and one or more servers with the distributed function.

The above-described functions can be implemented by hardware, software, or combination thereof.

The invention encompasses other embodiments of a method, a system, an apparatus, and a computer-readable medium, which are configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

FIG. 7 illustrates a Home Agent Address Discovery Reply message example;

FIG. 14 illustrates a Neighbor Cache management table provided in a router;

FIG. 15 illustrates a Binding Cache management table provided in the HA;

FIG. 16 illustrates a HA list table provided in a representative HA of the HA 1;

FIG. 17 illustrates a notification information management table provided in the representative HA of the HA 1 in accordance with a preferred Embodiment 2 of the invention;

FIG. 18 illustrates an HA load information management table provided in a distributed HA of the HA 1;

FIG. 19 illustrates an HA load information management table provided in the representative HA of the HA 1;

FIG. 27 illustrates a BC information management table provided in the representative HA of the HA 1 in accordance with a preferred Embodiment 3 of the invention;

DESCRIPTION OF THE PREFERRED EMBODIMENTS

A method and apparatus for mobile communication utilizing load balancing is disclosed. Numerous specific details are set forth in order to provide a thorough understanding of the present invention. It will be understood, however, to one skilled in the art, that the present invention may be practiced without some or without all of these specific details. The term "device" as used in the present invention generally means hardware, software, or combination thereof.

Using the accompanying drawings, a preferred Embodiment 1 of the present invention will now be described. As a typical example, using a scenario in which a Mobile IPv6 complaint mobile node (MN) has moved to another network (hereinafter referred to as a foreign network) outside its home link (hereinafter referred to as a home network) and registers its current location with an HA, using the HA address discovery function, Embodiment 1 of the invention will be explained in detail.

Figure 1:
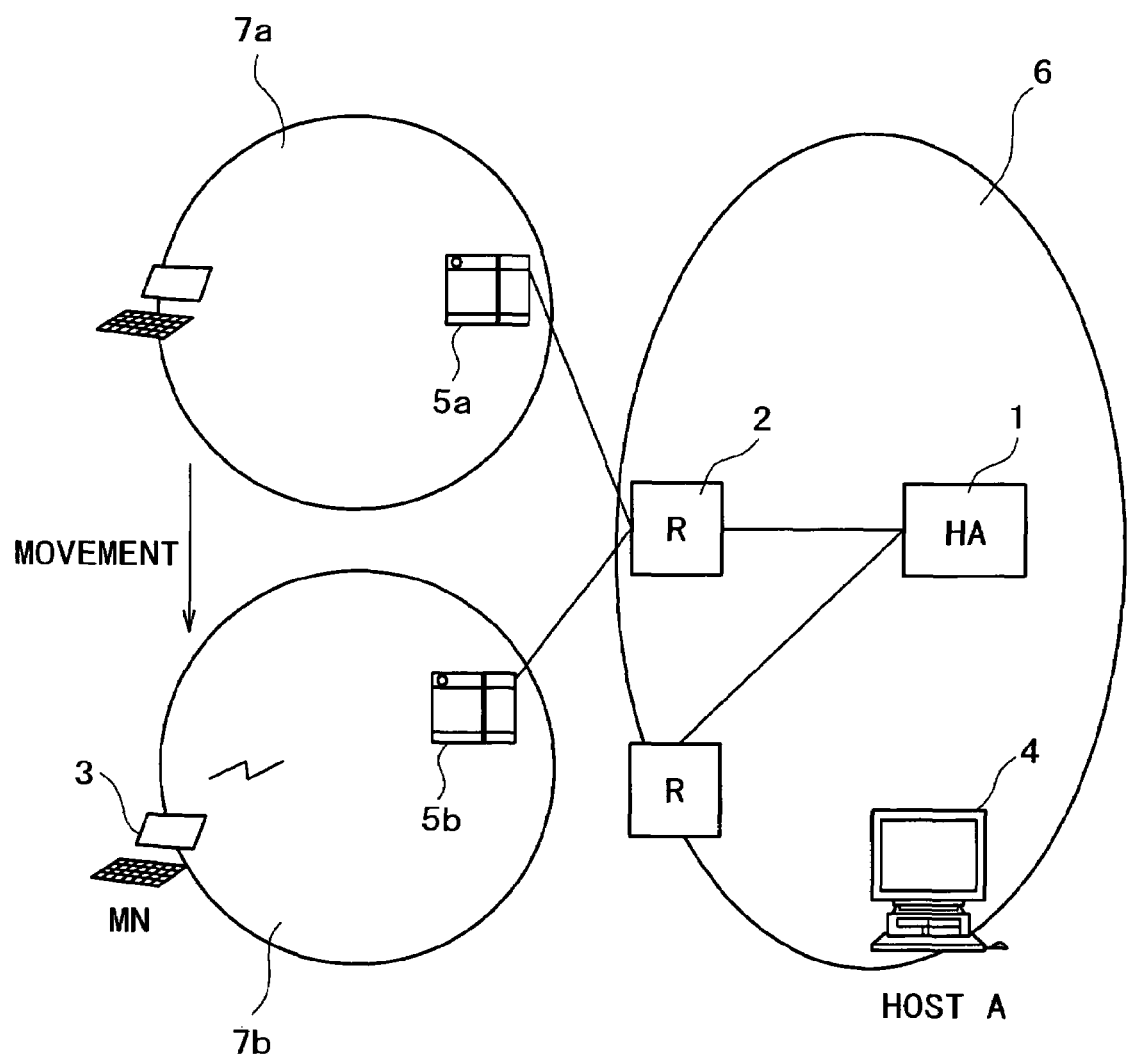
FIG. 1 is a diagram showing an example of topology of communication networks according to the present invention.

FIG. 1 shows an example of topology of communication networks according to the present invention. This topology consists of the home network 6 for the MN 3 and IPv6 networks 7 (7a, 7b). The MN 3 is a Mobile IPv6 compliant node. The network 6 and the networks 7 are connected via routers or transit networks.

The home network 6 includes an HA 1. The foreign networks 7 (7a, 7b) include routers 5 (5a, 5b), respectively.

The HA 1 is a Mobile IPv6 compliant home agent (HA). The HA manages the location information as to the MN 3 existing outside the home network 6. The HA 1 is provided with functions to capture a packet that a correspondent node (CN) terminal 4 transmits to the home address of the MN 3 and forward the packet to the MN 3 exiting in the foreign network 7b.

Figure 2:
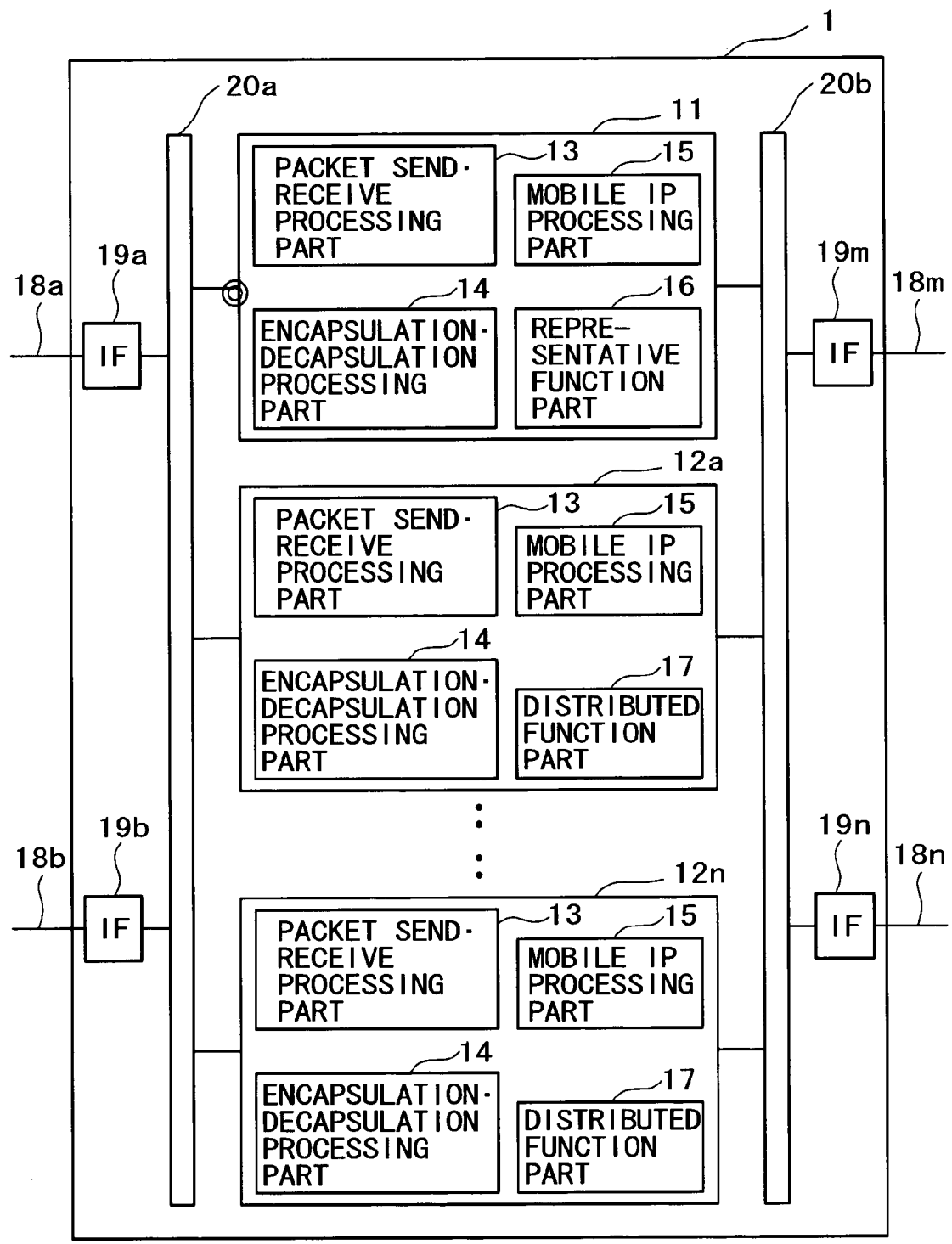
FIG. 2 is a block diagram of a home agent (HA)

FIG. 2 shows a configuration example of the HA 1 that is installed in the home network 6 for the MN 3. The HA 1 is comprised of servers (11, 12), interfaces (IF) 19 (19a, 19b, 19m, 19n) which respectively accommodate channels 18 (18a, 18b, 18m, 18n), and switches 20 (20a, 20b).

A server 11 is essentially comprised of a packet send/receive processing part 13, encapsulation/decapsulation processing part 14, Mobile IP processing part 15, and representative function part 16.

The packet send/receive processing part 13 is provided with function to send or receive data packets. The encapsulation/decapsulation processing part 14 is provided with function to attach or detach an IP header to data packets.

The Mobile IP processing part 15 is provided with a Mobile IP protocol processing function and a home agent (HA) function of Mobile IP. The HA function of Mobile IP includes a Binding Cache management table 320, HA list table 330, and HA list creation routine 60.

The representative function part is essentially provided with a function that collects HA information and load information from the servers, and an HA load information management table 360.

The server 11 having the representative function part 16 will be called a representative HA hereinafter.

FIG. 15 illustrates an example of structure of the Binding Cache management table 320. The Binding Cache management table 320 stores at least the following entries in a set: the home address of an MN 321 as the key entry, Care of Address (CoA) 322 acquired by the MN in a foreign network, lifetime 323 indicating the period of validity of the Binding Cache, a flag 234 indicating home registration, and a sequence number 325 that is used for authenticating a location registration request (Binding Update) message that the MN sends the HA 1.

FIG. 16 illustrates an example of structure of the HA list table 330. The HA list table 330 stores at least the following entries in a set: the link local address of an HA 331 as the key entry, global address of the HA 332, HA preference 333 indicating preference of the HA, and remaining lifetime 334 indicating the remaining period of validity of the HA.

FIG. 19 illustrates an example of structure of the HA load information management table 360 provided in the server 11. The HA load information management table 360 stores at least the following entries in a set: the address 361 of a server including a distributed function part 17 (distributed HA) 12 as the key entry, the number of Binding Cache entries 362 retained by the distributed HA, the number of transmitted packets 363, and the number of received packets 364.

Returning to FIG. 2, the HA 1 configuration example will be further explained.

A server 12 (12a, 12n) is essentially comprised of a packet send/receive processing part 13, encapsulation/decapsulation processing part 14, Mobile IP processing part 15, and distributed function part 17. Difference between the server 12 and the server 11 is that the server 12 has the distributed function part 17 instead of the representative function part 16. The Mobile IP processing part 15 of the server 12 is provided with a RA transmission processing routine 80.

The server 12 having the distributed function part 17 will be called a distributed HA hereinafter.

The distributed function part 17 is essentially provided with a function that notifies the server 11 (representative HA) of HA information and load information as to the distributed HA itself and an HA load information management table 350.

FIG. 18 illustrates an example of the structure of the HA load information management table 350 provided in each server 12.

The HA load information management table 350 stores at least the following entries in a set: the address 351 of a distributed HA as the key entry, the number of Binding Cache entries 352 retained by the distributed HA, the number of transmitted packets 353, and the number of received packets 354.

In Embodiment 1, the HA 1 accommodates the home network 1. A Mobile IPv6 Home-Agents Anycast Address is assigned to the interface of the representative HA 11.

Figure 23:
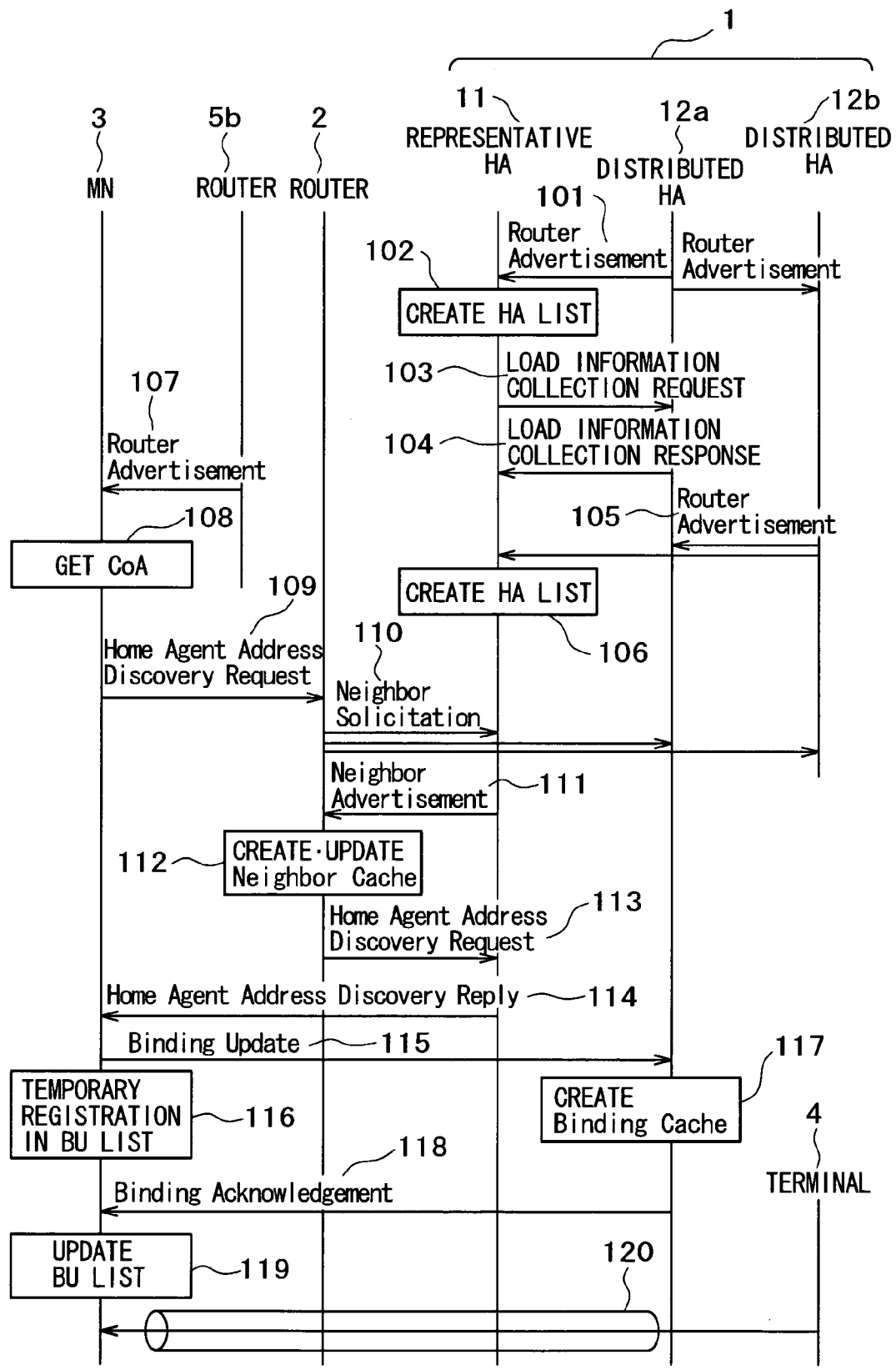
FIG. 23 is a MN location registration sequence diagram in the present invention, which illustrates the sequence for initiating communication between a terminal in the home network and a Mobile IPv6 compliant MN.

According to a sequence diagram which is shown in FIG. 23, the sequence until the terminal 4 in the network 6 shown in FIG. 1 starts to communicate with the MN 3 existing in the network 7b will be explained.

In order to communicate HA information, each distributed HA 12 (12a, 12b) activates the RA transmission processing routine 80 and transmits Unsolicited Router Advertisement messages.

Figure 21:
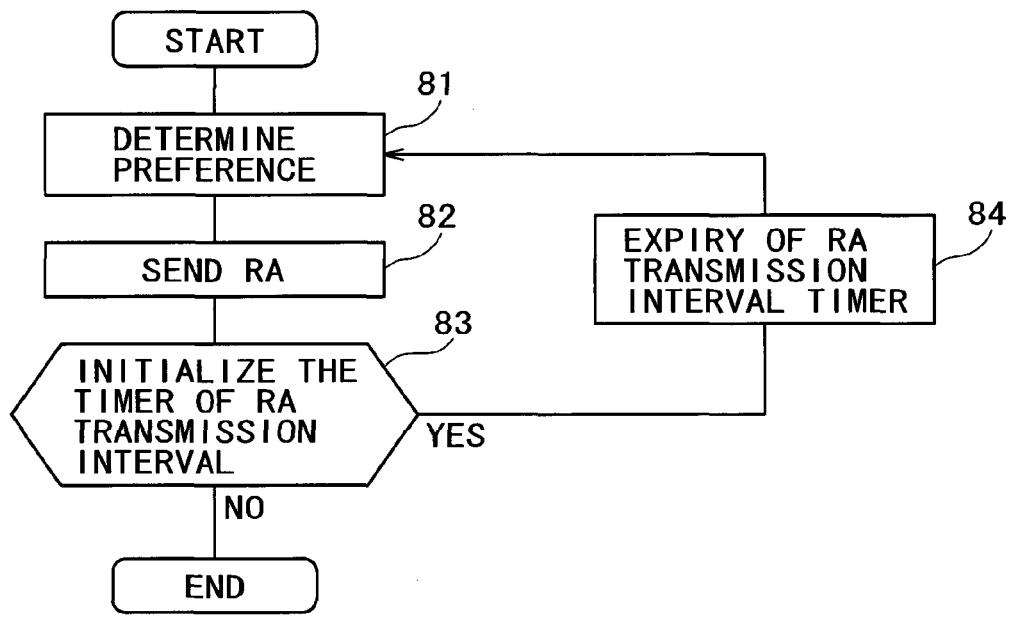
FIG. 21 is a flow diagram illustrating a procedure by an RA transmission processing routine provided in a distributed HA of the HA 1.

FIG. 21 illustrates the RA transmission processing routine 80 procedure.

The distributed HA 12 determines preference of the distributed HA 12 itself (81). The preference value of each distributed HA is set as configuration information beforehand.

Each distributed HA 12 (12a, 12b) sends the Router Advertisement messages including the preference determined in the step 81 to the multicast address (ff02::1) of all nodes (82, 101, 105).

Figure 3:
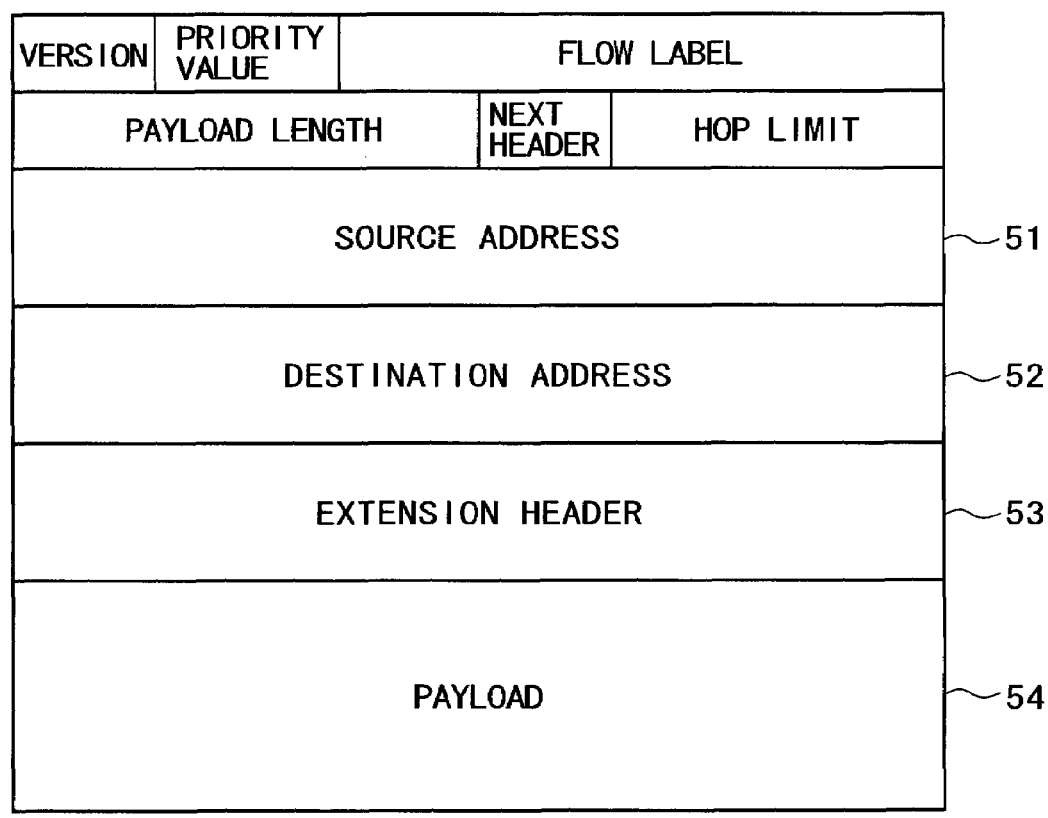
FIG. 3 illustrates an IPv6 packet format.

FIG. 3 illustrates an IPv6 packet format.

Figure 9:
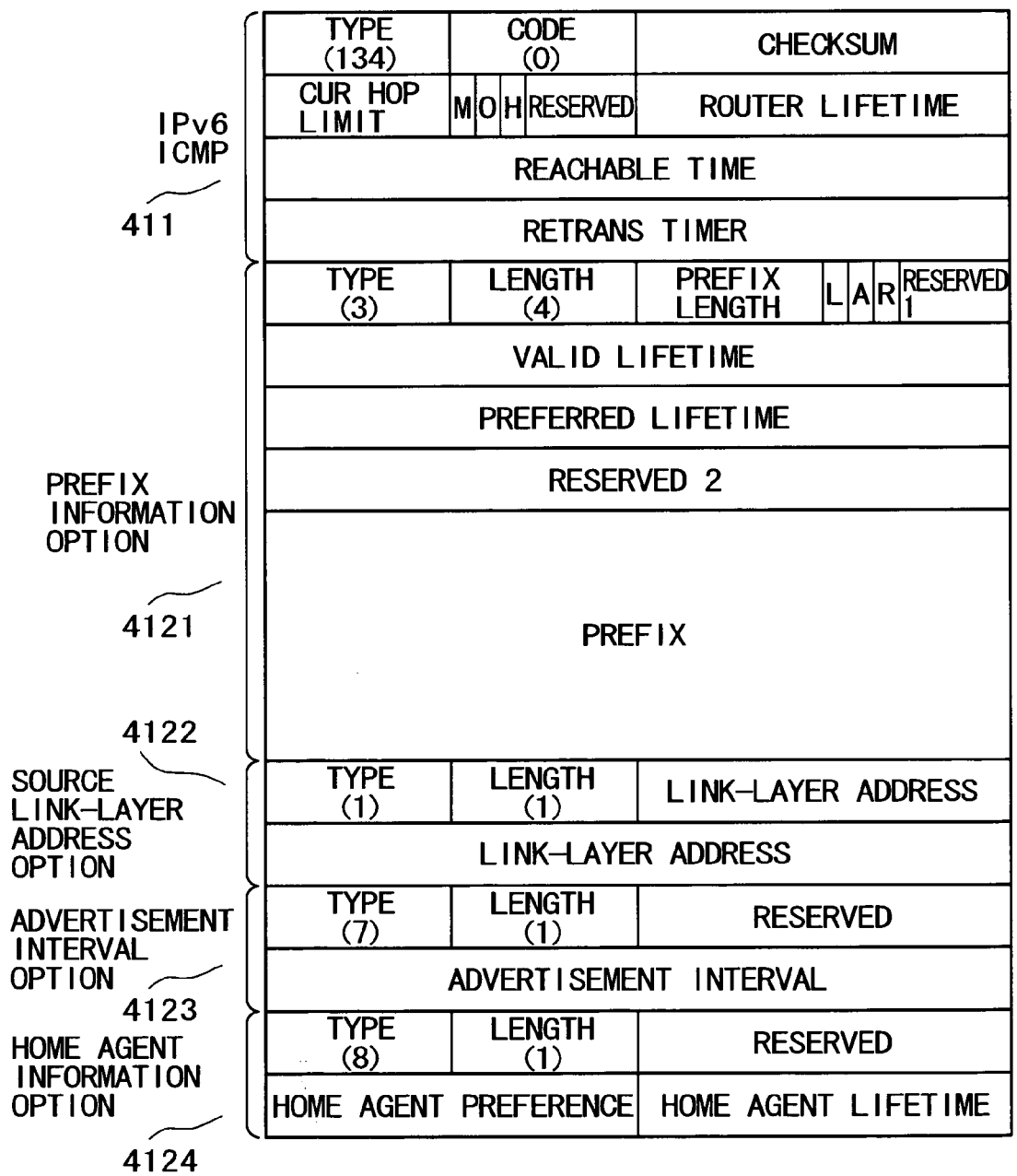
FIG. 9 illustrates Router Advertisement message example 2.

FIG. 9 illustrates a format example of the Router Advertisement message S6 to be transmitted by the distributed HA 12. The Router Advertisement message S6 is stored in the payload 54 of an IPv6 packet.

The Router Advertisement message to be transmitted by a distributed HA 12a conveys the following information. The link local address of the distributed HA 12a is set in the source IP address 51 field of the IPv6 header. An H bit is set in the ICMP header 411. An R bit is set in the prefix information option 4121 part and the complete address of the distributed HA 12a is set in the prefix part. The preference determined in the step 81 is set in the home agent preference field of the home agent information option 4124 part.

Next, an RA transmission interval timer is initialized (83). At the expiry of the RA transmission interval timer (84), the procedure returns to the step 81. When the RA transmission interval timer has failed to be initialized in the step 83, or when the RA transmission is aborted, this routine terminates.

The administrator sets the initial value of the RA transmission interval timer.

When the representative HA 11 receives the Router Advertisement message (101) from the distributed HA 12a, it activates the HA list creation routine 60.

Figure 20:
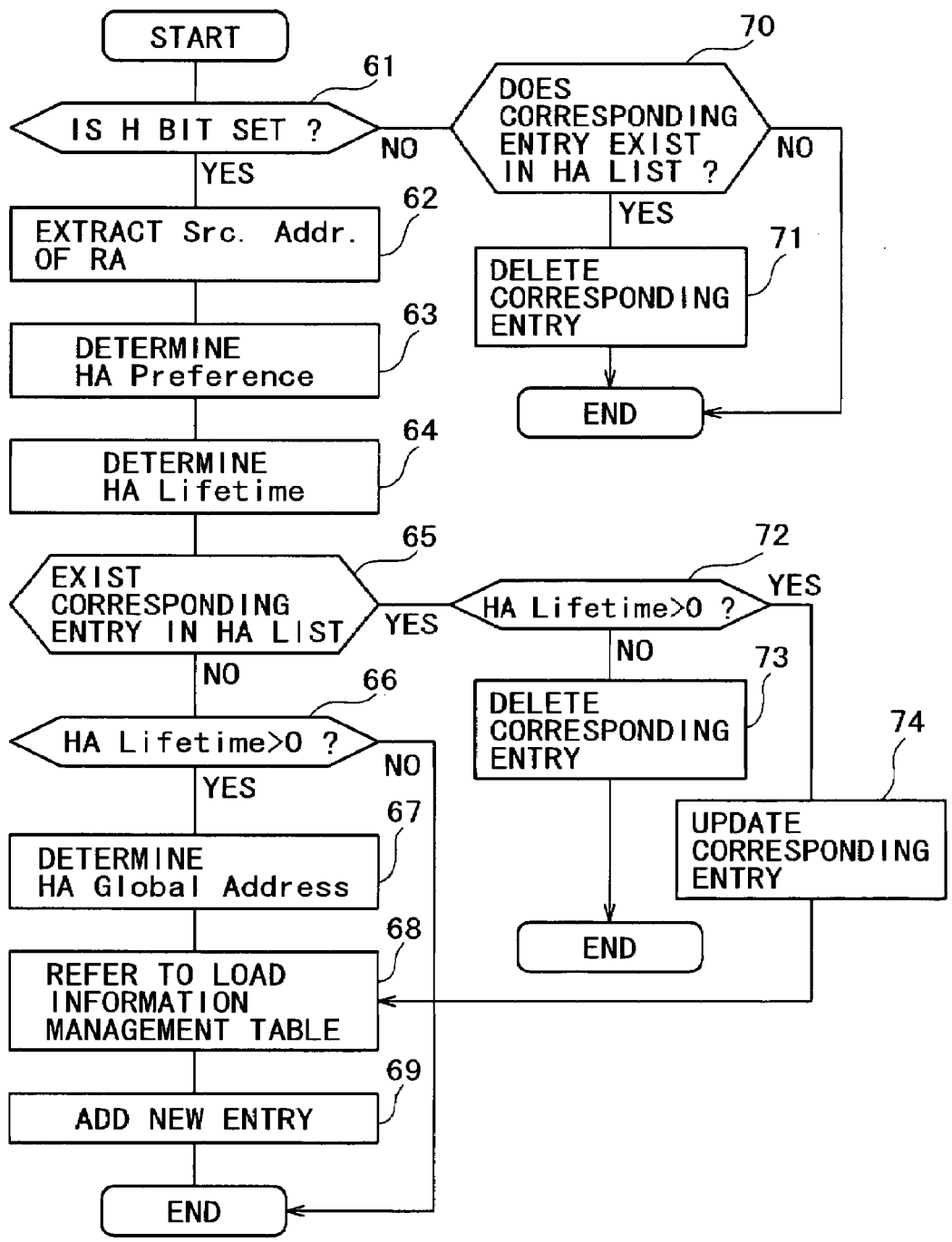
FIG. 20 is a flow diagram illustrating a procedure by an HA list creation routine provided in the representative HA of the HA 1.

FIG. 20 illustrates the HA list creation routine 60 procedure.

The representative HA 11 refers to the H bit in the received Router Advertisement message (61).

If the H bit is set, the representative HA 11 extracts the source address of the Router Advertisement message (62). The source address field contains the link local address of the distributed HA 12.

The representative HA 11 extracts the preference of the Router Advertisement sender (distributed HA 12a, distributed HA 12b) (63). The preference is contained in the home agent preference field in the home agent information option 4124 part. If the Router Advertisement message does not include the home agent information option 4124 part, the HA 11 takes the preference to be its default setting of "0".

Next, the representative HA 11 extracts the lifetime of the Router Advertisement sender (64). The lifetime is contained in the home agent lifetime field in the home agent information option 4124 part. If the Router Advertisement message does not include the home agent information option 4124 part, the HA 11 gets the information contained in the router lifetime field in the Router Advertisement message.

Then, the representative HA 11 searches the HA list table 330 for the address extracted in the step 62 (65). If the corresponding entry does not exist in the HA list table and if the lifetime extracted in the step 64 is greater than 0 (66), the HA 11 refers to the R bit in the preference information option part. If the R bit is set, the HA 11 extracts the global address of the Router Advertisement sender (distributed HA 12) from the prefix field (67).

Next, the HA 11 searches the HA load information management table 360 for the address extracted in the step 62 or step 67 (68).

In the step 68, if the corresponding entry exists in the HA load information management table 360, the representative HA 11 checks the number of BC entries, the number of transmitted packets, and the number of received packets to see whether any of these numbers exceeds its threshold. If any threshold is exceeded, the HA 11 decreases the preference value determined in the step 63. The thresholds of the above numbers are set beforehand.

The representative HA 11 adds the entry of the distributed HA 12 to the HA list table (69, 106). The representative HA 11 terminates this routine.

The representative HA 11 periodically collects load information from each distributed HA 12 and updates the HA load information management table 360. The administrator sets in advance the period of time intervals at which the HA 11 will collect the load information.

The representative HA 11 sends a load information collection request message to the distributed HA 12a and collects the load information for the distributed HA 12 (103). The HA 11 collects load information, using, for example, a Simple Network Management Protocol (SNMP).

The distributed HA 12 refers to the HA load information management table 350 and notifies the representative HA 11 of load information (104).

The representative HA 11 extracts the load information for the distributed HA 12 from the load information collection response message and stores it into the HA load information management table 360.

Figure 12:
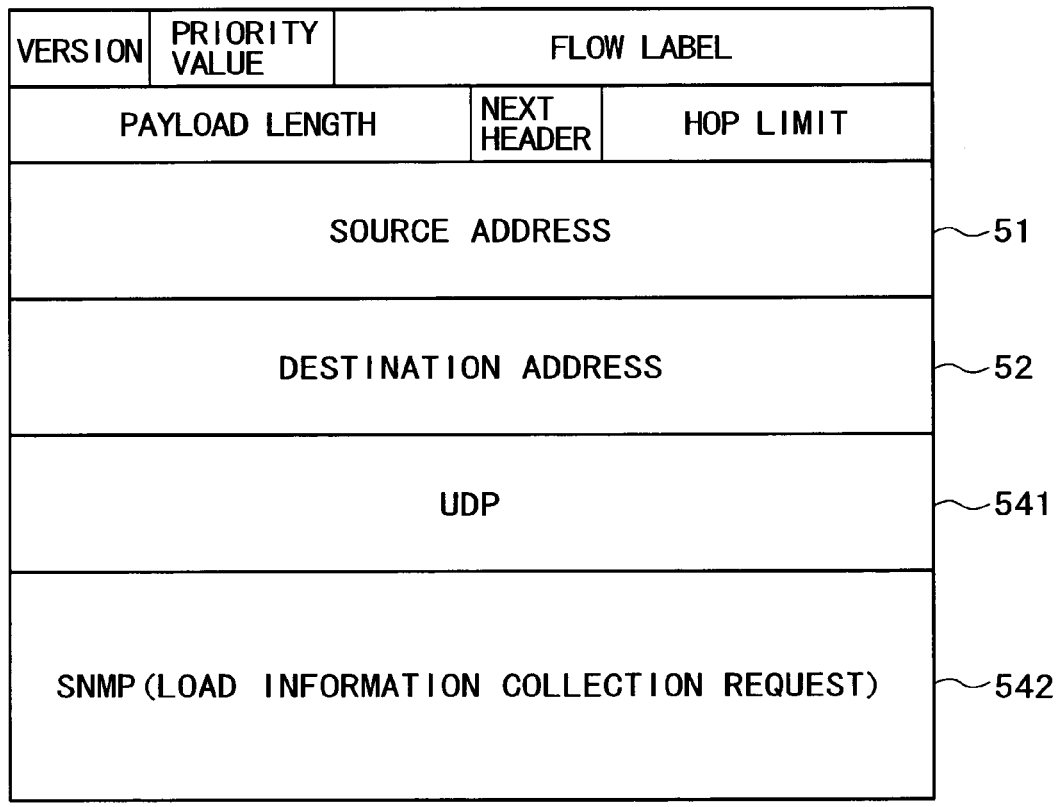
FIG. 12 illustrates a load information collection request message example.

FIG. 12 illustrates a format example of the load information collection request message S21.

Figure 13:
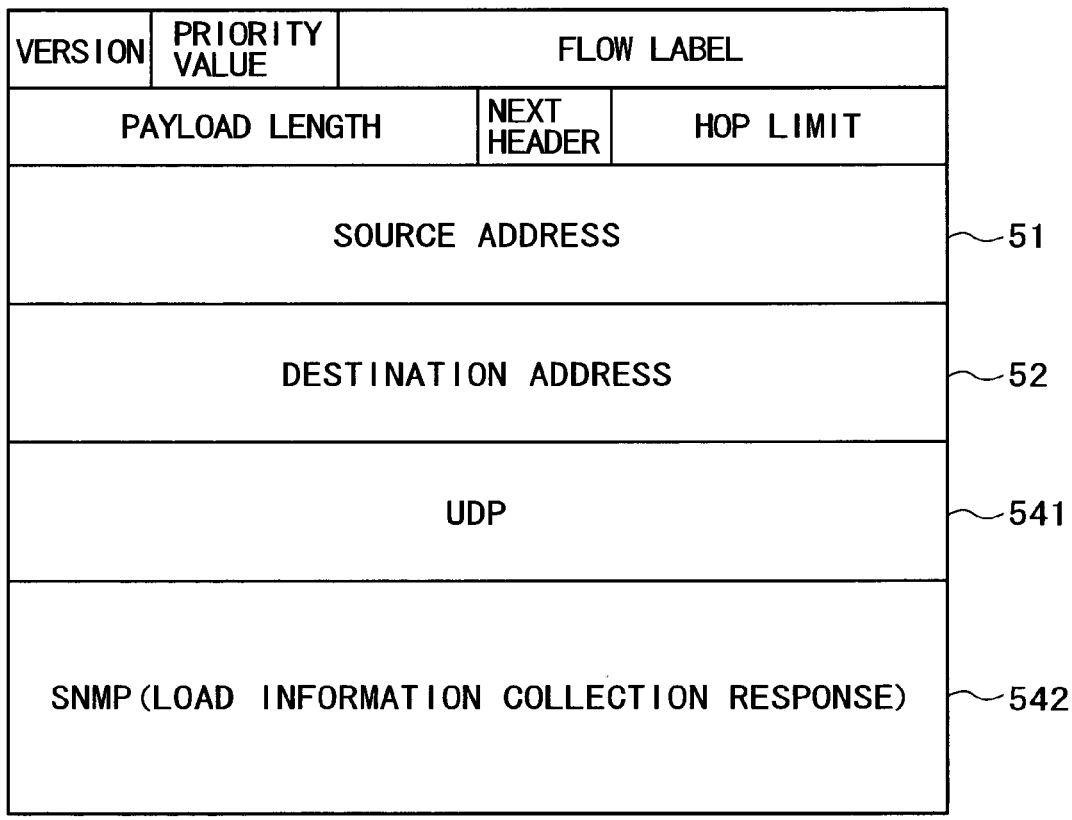
FIG. 13 illustrates a load information collection response message example.

FIG. 13 illustrates a format example of the load information collection response message S22.

At the step 61 of FIG. 20, if the H bit is not set, the representative HA 11 searches the HA list table 330 for the source address of the Router Advertisement message (70). If the corresponding entry exists in the HA list, the representative HA 11 deletes that entry (71) and terminates the HA list creation routine. If the corresponding entry does not exist, the HA 11 terminates this routine.

At the step 65, if the corresponding entry exists in the HA list table 330, the representative HA 11 refers to the lifetime extracted in the step 64 (72). If the lifetime is greater than 0, the HA 11 updates the lifetime value (74) and the procedure goes to step 68.

At the step 72, if the lifetime is 0 or less, the HA 11 deletes the corresponding entry (73) and terminates the HA list creation routine.

At the step 66, if the lifetime is 0 or less, the HA 11 terminates the HA list creation routine.

The MN 3 receives a Router Advertisement message through a router 5b existing in the network 7b. The MN 3 determines what method of getting CoA (Care of Address) to use by referring to the M bit in the Router Advertisement message. If the M bit is 1, the MN gets CoA, using stateful address autoconfig of IPv6. If the M bit is not set, the MN gets CoA, using stateless address autoconfig of IPv6 (108).

Figure 8:
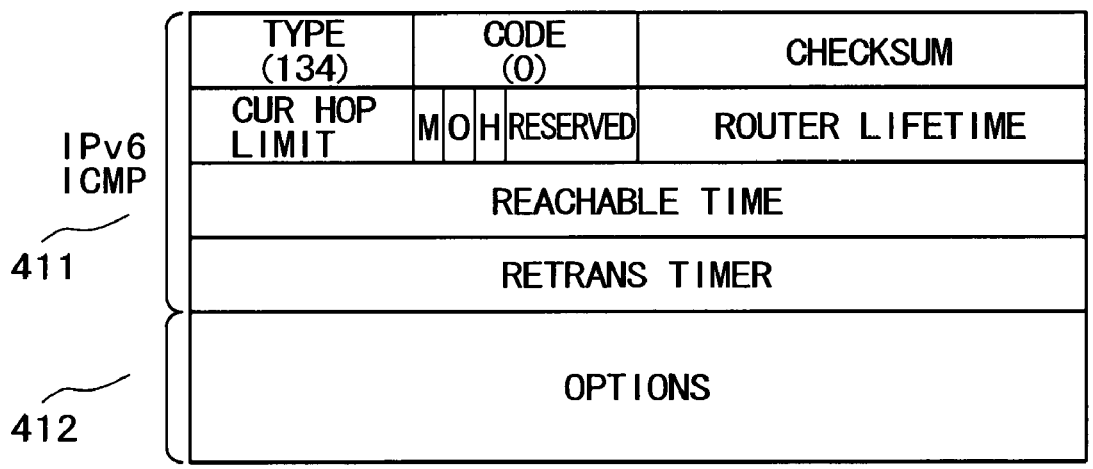
FIG. 8 illustrates Router Advertisement message example 1.

FIG. 8 illustrates a format example of the Router Advertisement message S5. The Router Advertisement message S5 is stored in the payload 54 of an IPv6 packet.

The MN 3 that acquired CoA in the network 7b registers its current location with an HA. When the IP address of the HA is unknown, the MN 3 is getting the address of the HA, using the HA address discovery function.

Figure 6:
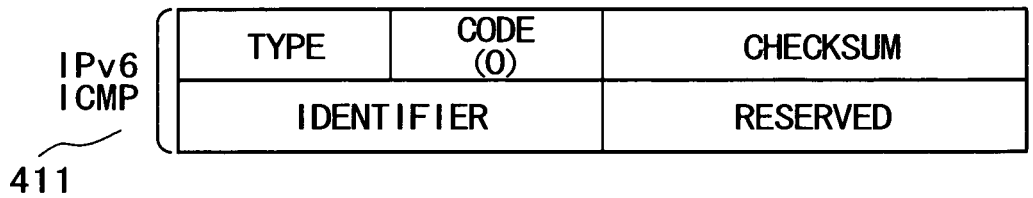
FIG. 6 illustrates a Home Agent Address Discovery Request message example.

The MN 3 creates a Mobile IPv6 Home-Agents Anycast Address from the subnet prefix of the home network and sends a Home Agent Address Discovery Request message to the above address (109). FIG. 6 illustrates a format example of the Home Agent Address Discovery Request message S3. The Home Agent Address Discovery Request message S3 is stored in the payload 54 of an IPv6 packet. The source address 51 field of the packet for conveying the Home Agent Address Discovery Request message S3 contains the CoA acquired by the MN 3 in the network 7b.

Figure 22:
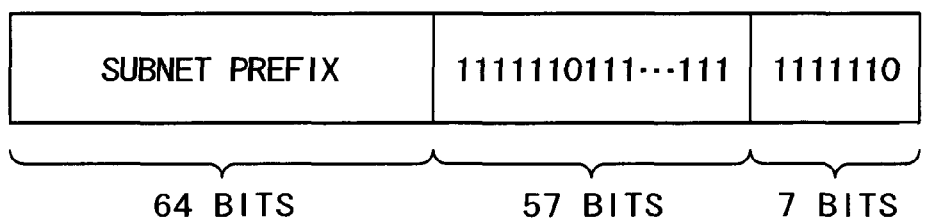
FIG. 22 illustrates a Mobile IPv6 Home-Agents Anycast Address format.

FIG. 22 illustrates a format example of a Mobile IPv6 Home-Agents Anycast Address A1. Its upper 64 bits represent the subnet prefix of the home network for the MN 3.

A router 2 in the network 6 that received the above message determines the next hop from the destination address of the above Home Agent Address Discovery Request message. If the next hop equals the destination address, the router 2 searches the Neighbor Cache management table 310 for the destination address and determines the link-layer address associated with the destination address.

FIG. 14 illustrates an example of structure of the Neighbor Cache management table 310. The Neighbor Cache management table 310 stores at least the following entries in a set: IP address 311 as the key entry, link-layer address 312, and a flag 313 indicating whether the neighboring node is a host or router.

Returning to FIG. 23, the remaining part of the sequence will be further explained.

If the destination address of the Home Agent Address Discovery Request message does not exist in the above Neighbor Cache management table 310, the router 2 sends Neighbor Solicitation messages to the multicast address of its neighboring nodes (110).

Figure 4:
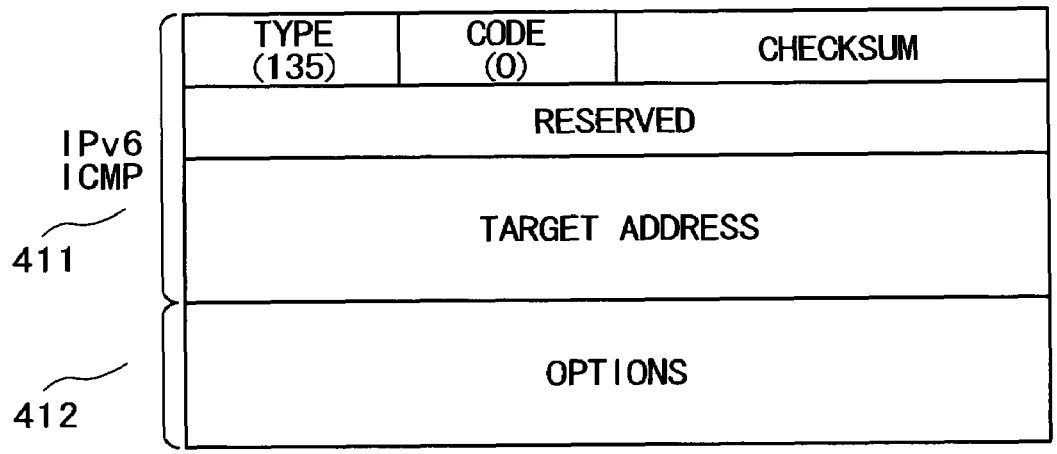
FIG. 4 illustrates a Neighbor Solicitation message example.

FIG. 4 illustrates a format example of the Neighbor Solicitation message S1. The Neighbor Solicitation message S1 is stored in the payload 54 of an IPv6 packet. The target address field in the IPv6 ICMP 411 part of this message contains the destination address (Mobile IPv6 Home-Agents Anycast Address) of the Home Agent Address Discovery Request message.

In Embodiment 1, the Mobile IPv6 Home-Agents Anycast Address is assigned to the interface with the router 2 in the representative HA 11. Thus, the representative HA 11 receives the above Neighbor Solicitation message. The representative HA 11 sends a Neighbor Advertisement message to the source address of the Neighbor Solicitation message (111).

Figure 5:
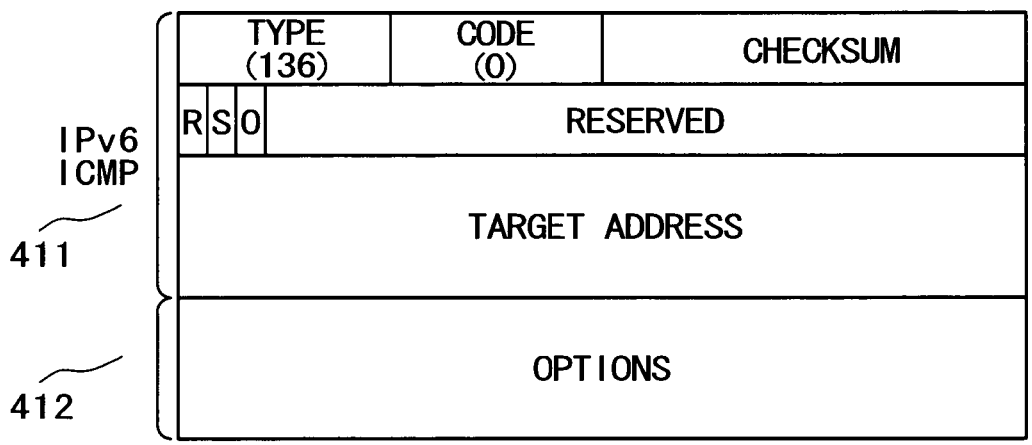
FIG. 5 illustrates a Neighbor Advertisement message example.

FIG. 5 illustrates a format example of the Neighbor Advertisement message S2. The Neighbor Advertisement message S2 is stored in the payload 54 of an IPv6 packet. The target address field in the IPv6 ICMP 411 part of this message contains the Mobile IPv6 Home-Agents Anycast Address. In the IPv6 ICMP 411 part of this message, an Override flag (O bit) is not set. Its Options 412 part contains the link-layer address of the interface assigned the Mobile IPv6 Home-Agents Anycast Address.

When the router 2 receives the Neighbor Advertisement message, it creates new entry in the Neighbor Cache management table 310 (112). Referring to the Neighbor Cache management table, the router 2 forwards the Home Agent Address Discovery Request message to the representative HA 11 (113).

When the representative HA 11 receives the above Home Agent Address Discovery Request message, it refers to the HA list table 330. The representative HA 11 puts the entries in the HA list table in order by their preference value. Then, the HA 11 checks whether the HA list includes the global unicast address of the representative HA 11. If the HA list includes the address of the representative HA 11, this entry is moved to the end of the HA list. If the HA list does not include the address of the representative HA 11, the address of the representative HA 11 is appended to the end of the HA list.

The representative HA 11 sends a Home Agent Address Discovery Reply message to the MN 3 (114).

FIG. 7 illustrates a format example of the Home Agent Address Discovery Reply message S4. The Home Agent Address Discovery Reply message. S4 is stored in the payload 54 of an IPv6 packet.

The Home Agent Address Discovery Reply message sent by the representative HA 11 to the MN conveys the following information. The Home Agent Addresses field in its IPv6 ICMP 411 part contains the above-mentioned HA list. The CoA that the MN 3 acquired in the network 7b is set in the destination address 52 field of the packet for this message. The global unicast address of the representative HA 11 is set in the source address 51 field.

The MN 3 extracts the HA list from the Home Agent Addresses field of the above Home Agent Address Discovery Reply message.

Then, the MN 3 checks whether the HA list includes the source address of the above Home Agent Address Discovery Reply message. If the HA list includes the source address (global unicast address of the representative HA 11), the MN 3 registers its current location with an HA with its address described in the HA list.

Here, the address of the distributed HA 12a is assumed set at the top of the HA list. The MN 3 sends a Binding Update message to register its current location to the distributed HA 12a, a constituent of the HA 1 existing in the network 6 (115). The MN 3 temporarily registers entry "BU destination address=the address of the distributed HA 12a" into the Binding Update List management table (116).

Figure 10:
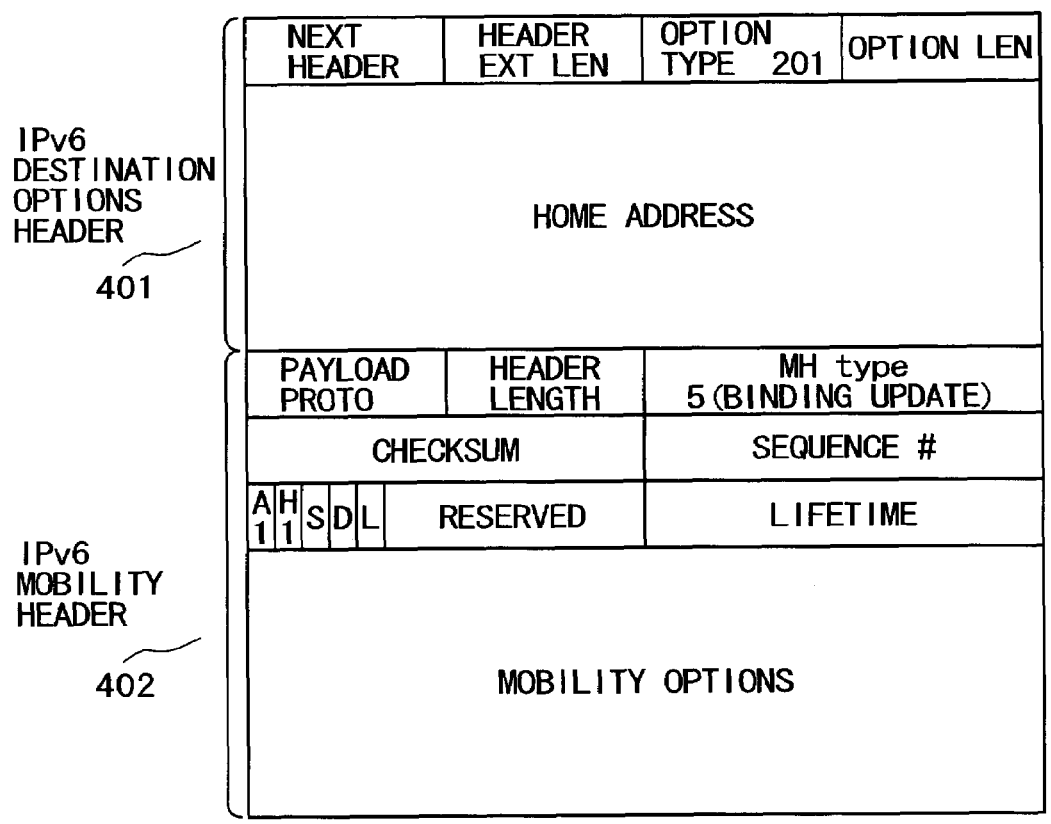
FIG. 10 illustrates a Binding Update message example.

FIG. 10 illustrates a format example of the Binding Update message S11. Its IPv6 Destination Options Header 401 and IPv6 Mobility Header 402 are stored in the extension header 53 of an IPv6 packet.

The Binding Update message that the MN 3 sends the distributed HA 12a conveys the following information. The CoA of the MN 3 is set in the source address 51 field in the IPv6 packet header. The home address of the MN 3 is set in the home address field in the IPv6 Destination Options Header. Alternatively, the home address of the MN 3 may be set in the source address 51 field in the IPv6 packet header. In this case, the CoA of the MN 3 is contained as Alternate Care-of-Address options in the Mobility Options field in the IPv6 Mobility Header 402.

Having received the Binding Update message, the distributed HA 12a searches the Binding Cache management table 320 for the home address of the MN 3. The HA 12a gets the home address of the MN 3 from the home address field in the IPv6 Destination Options Header 401 of the Binding Update message.

If the MN 3 entry does not exist in the Binding Cache management table 320, the HA 12a adds the MN 3 entry to the Binding Cache management table 320 (117). In the Care of Address 322 column of the above entry, the CoA that the MN 3 acquired in the foreign network 7b is set. The HA 1 operates as proxy for the MN 3.

If the MN 3 entry exists in the Binding Cache management table 320, the HA 12a updates that entry in the Binding Cache management table 320.

The distributed HA 12a sends a Binding Acknowledgement message to the MN 3 (118).

Figure 11:
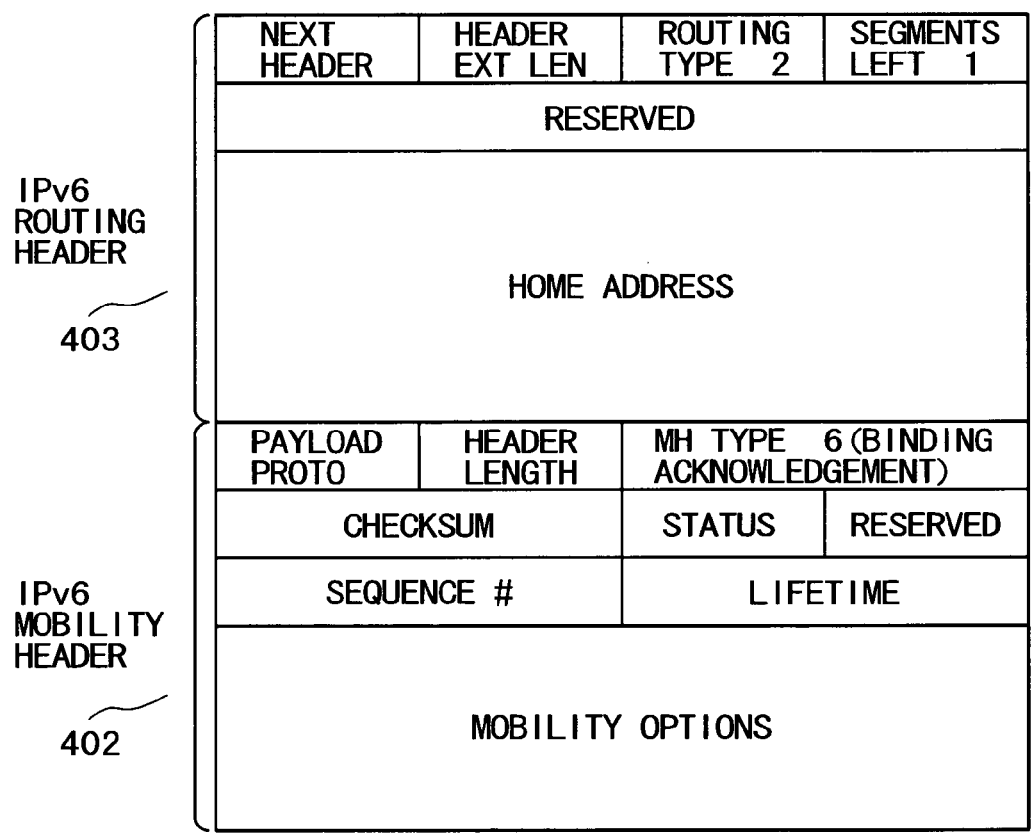
FIG. 11 illustrates a Binding Acknowledgement message example.

FIG. 11 illustrates a format example of the Binding Acknowledgement message S12. Its IPv6 Routing Header 403 and IPv6 Mobility Header 402 are stored in the extension header 53 of an IPv6 packet. The Binding Acknowledgement message that the distributed HA 12a sends the MN 3 conveys the following information. The source address of the Binding Update message received in the step 115 is contained in the destination address 52 field in the IPv6 packet header. If the destination address 52 field contains an address other than the home address of the MN 3, the home address of the MN 3 is contained in the home address field in the IPv6 Routing Header 403.

When the MN 3 receives the Binding Acknowledgement message that indicates that Binding Update has finished normally, it registers the entry which has been temporarily registered in the step 116 into the Binding Update List management table (119).

Next, a procedure in which the terminal 4 in the network 6 sends a packet to the MN 3 will be described.

Here, it is assumed that the terminal 4 has acquired the home address of the MN 3 using a name resolution service, such as domain name service (DNS) or another suitable service.

The terminal 4 sends a packet to the home address of the MN 3. The distributed HA 12a operating as proxy for the MN 3 captures the packet. The distributed HA 12a attaches the IPv6 header to the original packet, referring to the MN 3 entry created in the step 117. In the encapsulation header, The CoA of the MN 3 is set in the destination address field and the address of the distributed HA 12a is set in the source address field (120).

Now, the corresponding sequence assumed to be performed in a prior art mobile communication system will be described, using FIG. 24 and FIG. 25.

Figure 24:
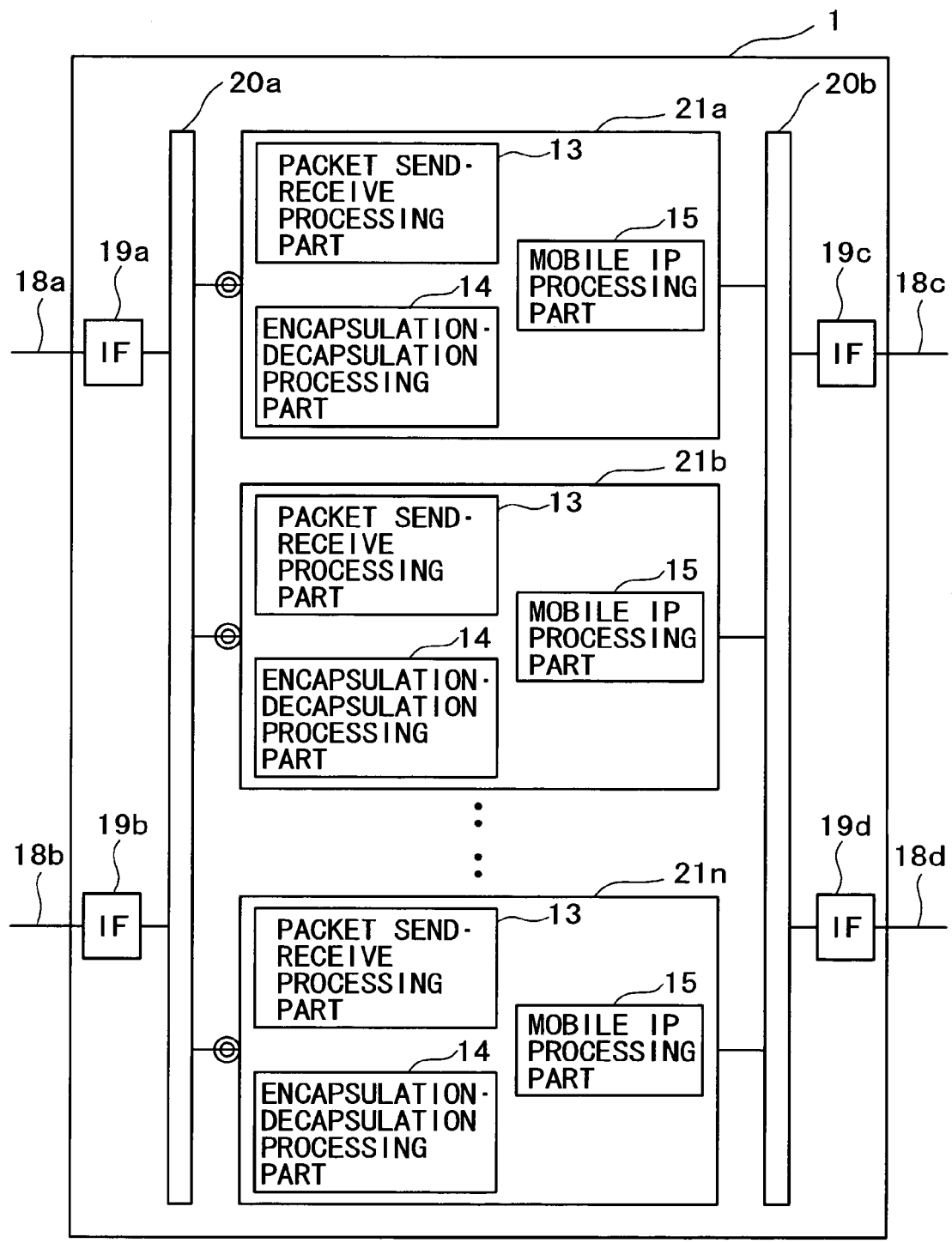
FIG. 24 is a block diagram showing an assumed configuration of a prior art HA example.

FIG. 24 shows an assumed configuration of a prior art HA 1 example when the HA 1 consists of one or more servers.

The HA 1 is comprised of servers 21 (21a, 21b, 21c), interfaces (IF) 19 (19a, 19b, 19m, 19n) which respectively accommodate channels 18 (18a, 18b, 18m, 18n), and switches 20 (20a, 20b).

A server 21 is essentially comprised of a packet send/receive processing part 13, encapsulation/decapsulation processing part 14, and Mobile IP processing part 15.

In the HA 1 configuration example shown in FIG. 24, the HA 1 forms one home network. A Mobile IPv6 Home-Agents Anycast Address is assigned to the interfaces of all the servers 21.

Figure 25:
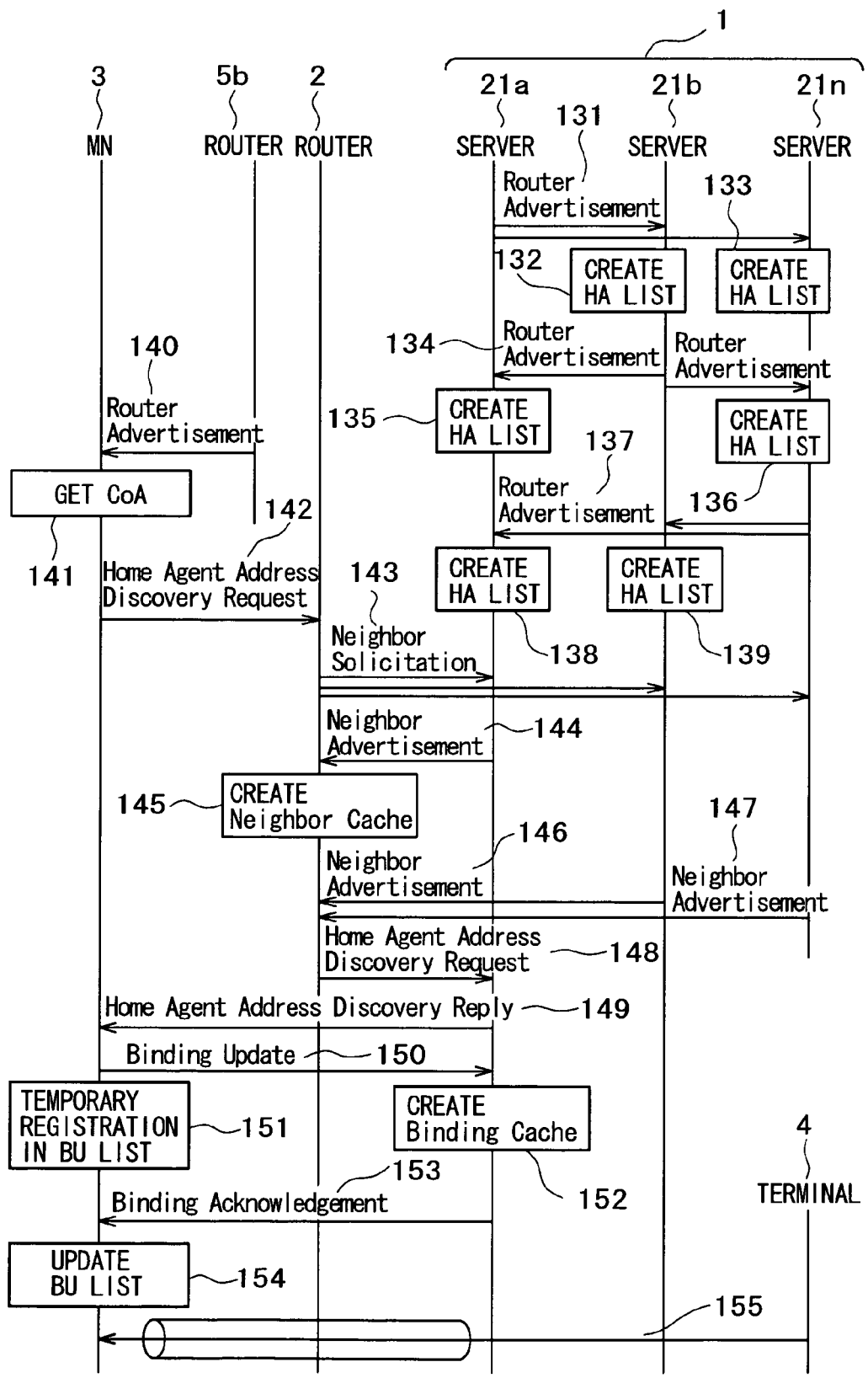
FIG. 25 is a sequence diagram of assumed MN location registration by prior art, which illustrates the sequence for initiating communication between a terminal in the home network and a Mobile IPv6 compliant MN.

According to a sequence diagram which is shown in FIG. 25, the sequence until the terminal 4 in the network 6 shown in FIG. 1 starts to communicate with the MN 3 existing in the network 7b will be explained.

Each server 21 transmits Unsolicited Router Advertisement messages to the multicast address (ff02::1) of all nodes (131, 134, 137).

The Router Advertisement messages to be transmitted by the servers 21 convey the following information. The link local address of each server 21 is set in the source IP address 51 field of the IPv6 header. An H bit is set in the ICMP header 411. An R bit is set in the prefix information option 4121 part and the complete address of the router advertisement sender server 21 is set in the prefix part. Preference of the router advertisement sender server 21 is set in the home agent preference field of the home agent information option 4124 part. The preference is set beforehand.

When a server 21 receives a router advertisement message, it extracts the parameters from the router advertisement message and creates an HA list (132, 133, 135, 136, 138, and 139).

Steps (140 through 142) in which the MN 3 gets CoA in the network 7b and sends a Home Agent Address Discovery Request message are the same as the steps 107 through 109 in Embodiment 1.

A router 2 in the network 6 that received the above Home Agent Address Discovery Request 142 message determines the next hop from the destination address of the above Home Agent Address Discovery Request message. If the next hop is the destination address, the router 2 searches the Neighbor Cache management table 310 for the destination address in order to determine the link-layer address associated with the destination address.

If the corresponding entry does not exist in the above Neighbor Cache management table 310, the router 2 sends Neighbor Solicitation messages to the multicast address of its neighboring nodes (143).

Because the Mobile IPv6 Home-Agents Anycast Address is assigned to the interfaces of all the servers 21, the servers 21 receive the above messages. The servers 21 sends back Solicited Neighbor Advertisement messages to the source address of the Neighbor Solicitation message (144, 146, and 147). In the above Solicited Neighbor Advertisement messages (144, 146, and 147), an Override Flag is not set.

When the router 2 receives the Neighbor Advertisement message (144) from the server 21a, it creates new entry in the Neighbor Cache management table 310 (145). When the router 2 receives the succeeding Neighbor Advertisement messages (146, 147) from the servers 21b, 21n, it does not update the entries in the Neighbor Cache management table 310. Referring to the Neighbor Cache management table 310, the router 2 forwards the Home Agent Address Discovery Request message to the server 21a (148).

When the server 21a receives the above Home Agent Address Discovery Request message, it refers to the HA list created in the step 138. The server 21a puts the entries in the HA list table in order by their preference value. Then, the server 21a checks whether the HA list includes the global unicast address of the server 21a. If the HA list includes the address of the server 21a at the top, this entry is deleted.

The server 21a sends a Home Agent Address Discovery Reply message to the MN 3 (149).

The MN 3 that acquired CoA in the network 7b extracts the HA list from the Home Agent Addresses field in the Home Agent Address Discovery Reply message received in the step 149.

Then, the MN 3 checks whether the HA list includes the source address of the above Home Agent Address Discovery Reply message. If the HA list does not include the source address, the MN 3 registers its current location with the sender of the Home Agent Address Discovery Reply message. If the HA list includes the source address, the MN 3 registers its current location, according to the HA list.

Here, it is assumed that the address of the server 21a is not set in the HA list. The MN 3 sends a Binding Update message to register its current location to the server 21a (150). The MN location registration steps (steps 150 through 154) are the same as the steps 115 through 119 in Embodiment 1.

The step in which the terminal 4 in the network 6 sends a packet to the MN 3 (step 155) is the same as the step 120 in Embodiment 1.

As indicated above, in the Neighbor Cache on the router 2, the information for the server 21a which transmitted the Neighbor Advertisement message that first arrived at the router is stored. Thus, the particular server 21a receives the Home Agent Address Discovery Request message transmitted to the Mobile IPv6 Home-Agents Anycast Address. The MN registers its current location, using the information conveyed by the Home Agent Address Discovery Reply message received from the above particular server 21a. Consequently, the load for MN location registration cannot be shared by a plurality of servers.

According to Embodiment 1 of the present invention, the HA 1 consists of a representative HA and distributed HAs. A Mobile IPv6 Home-Agents Anycast Address is assigned to the representative HA. The representative HA collects HA list information and load information from the distributed HAs and creates an HA list. When the HA 1 receives the Home Agent Address Discovery Request message from the MN 3, it sends back the Home Agent Address Discovery Reply message including the above HA list to the MN 3. Thus, the MN location registration task can be shared by a plurality of distributed HAs 12, even if the HA 1 is not provided with a load balancing device. After the completion of MN location registration, one of the distributed HAs 12 operates as proxy for the MN and, therefore, the packet forwarding task of the HA 1 can be also shared.

Because the representative HA 11 is provided with a listing device configured to dynamically generate an HA list, the HA 1 can have expandability; if there would be a need to increase or decrease the number of distributed HAs 12 in the HA 1, a distributed HA 12 can be added to or deleted from the HA list.

Using the accompanying drawings, a preferred Embodiment 2 of the present invention will be described.

In addition to the components of Embodiment 1, Embodiment 2 is characterized by including the following devices. The representative function part 16 of the representative HA 11 includes a notification information management table 340. The Mobile IP processing part 15 of the representative HA 11 includes a Home Agent Address Discovery Reply transmission processing routine 90.

Figure 17:
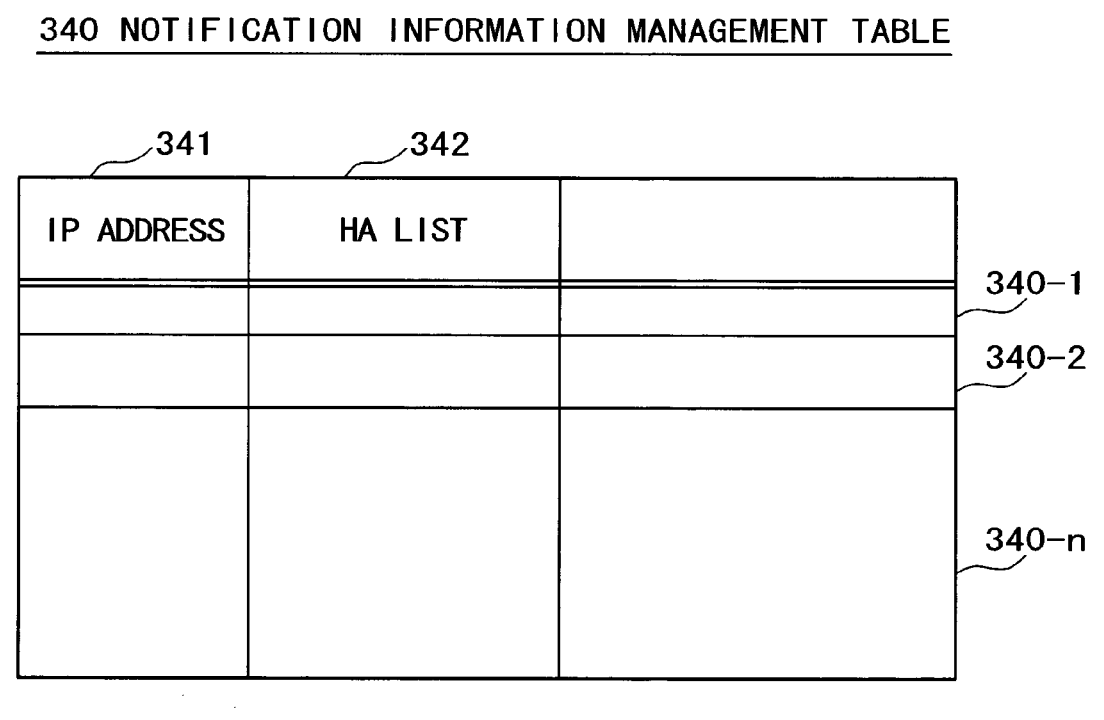

FIG. 17 illustrates an example of structure of the notification information management table 340. The notification information management table 340 stores at least the following entries in a set: the source address of a Home Agent Address Discovery Request message 341 as the key entry and an HA list 342 sent to that address.

Figure 26:
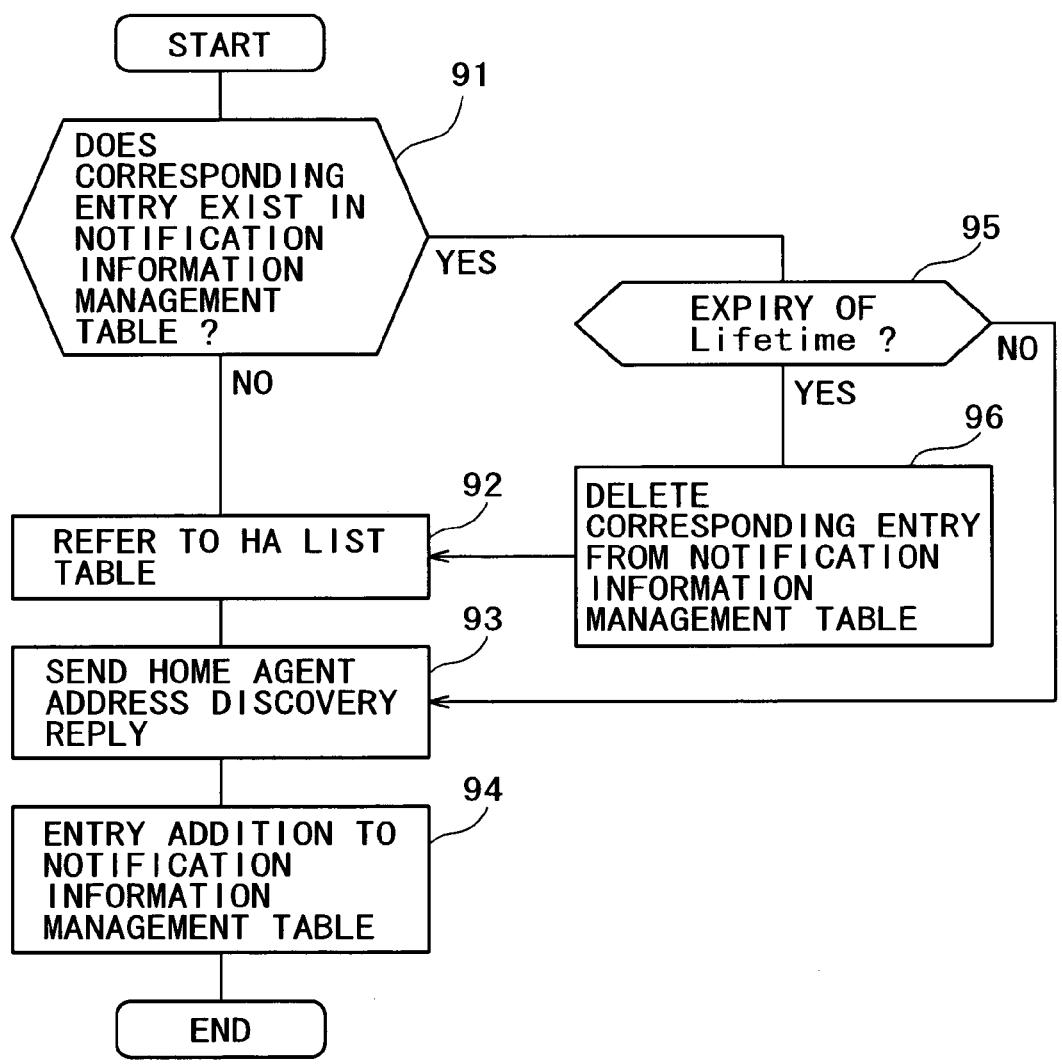
FIG. 26 is a flow diagram illustrating a procedure by a Home Agent Address Discovery Reply transmission processing routine provided in the representative HA of the HA 1 in accordance with Embodiment 2.

FIG. 26 illustrates the Home Agent Address Discovery Reply transmission processing routine 90 procedure.

When the representative HA 11 receives a Home Agent Address Discovery Request message (step 113 in FIG. 23), it activates the Home Agent Address Discovery Reply transmission processing routine 90.

The representative HA 11 searches the notification information management table 340 for the source address of the above message (91).

If the corresponding entry does not exist in the above table, the representative HA 11 refers to the HA list table 330 and creates an HA list (92).

The representative HA 11 sends a Home Agent Discovery Reply message including the HA list (93) (step 114 in FIG. 23). Then, the representative HA 11 adds the source address of the Home Agent Address Discovery Request message and the HA list in a set to the notification information management table 340 (94).

At the step 91, if the corresponding entry exists, the HA 11 searches the HA list table 330 for the HA address included in the HA list associated with that entry and refers to the lifetime value of the HA list table 330 (95). If the lifetime value of the HA entry does not expire, the HA 11 reads the HA list from the notification information management table 340 and sends the Home Agent Address Discovery Reply message to the MN (94).

At the step 95, if the lifetime of the HA entry has expired, the HA 11 deletes that entry from the notification information management table 340 (96) and the procedure goes to step 92.

According to Embodiment 2, the HA 1 retains the source address of a Home Agent Address Discovery Request message and the HA list sent to that address in a set for a given period. Consequently, when the HA 1 receives the Home Agent Address Discovery Request message twice or more times from the MN, it can send the same HA list to the sender of this message.

Using the accompanying drawings, a preferred Embodiment 3 of the present invention will be described.

In addition to the functions described with regard to Embodiment 1, Embodiment 3 is characterized by including the following devices. The representative function part 16 of the representative HA 11 includes a BC information management table 370. The Mobile IP processing part 15 of the representative HA 11 includes a Home Agent Address Discovery Reply transmission processing routine 50. The representative HA 11 includes devices for periodically getting Binding Cache table information from the distributed HAs 12.

FIG. 27 illustrates an example of structure of the BC information management table 370. The BC information management table 370 stores at least the following entries in a set: the home address of an MN 371 as the key entry, CoA 372, lifetime 373, and the address of a distributed HA 374.

Figure 28:
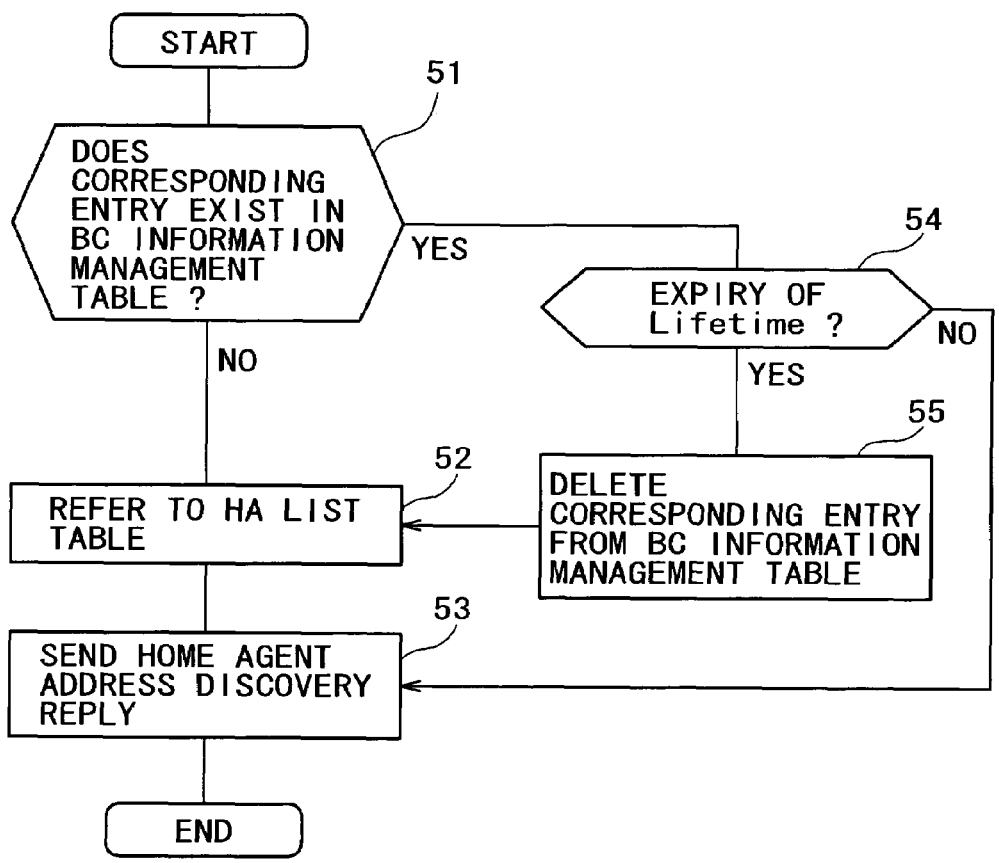
FIG. 28 is a flow diagram illustrating a procedure by a Home Agent Address Discovery Reply transmission processing routine provided in the representative HA in accordance with Embodiment 3.

FIG. 28 illustrates the Home Agent Address Discovery Reply transmission processing routine 50 procedure.

When the representative HA 11 receives a Home Agent Address Discovery Request message (step 113 in FIG. 23), it activates the Home Agent Address Discovery Reply transmission processing routine 50.

The representative HA 11 searches the BC information management table 370 for the source address of the above Home Agent Address Discovery Request message (51).

At the step 51, if the corresponding entry does not exist in the above BC information management table, the representative HA 11 refers to the HA list table and creates an HA list (52). The representative HA 11 sends a Home Agent Address Discovery Reply message including the HA list (53) (step 114 in FIG. 23). At the step 51, if the corresponding entry exists in the above BC information management table, the HA 11 refers to the lifetime value associated with the entry (54). If the lifetime value of the entry does not expire, the HA 11 reads the distributed HA address 374 associated with the entry. The representative HA 11 sends a Home Agent Address Discovery Reply message with the HA list including the above distributed HA address and the address of the representative HA 11 (53).

At the step 54, if the lifetime value of the entry expires, the HA 11 deletes that entry from the BC information management table (55) and then the procedure goes to step 52.

According to Embodiment 3, the representative HA 11 includes devices for getting Binding Cache from the distributed HAs 12. Consequently, when the MN 3 repeats transmission of the Home Agent Address Discovery Request message, the HA 1 can notify the MN of the address of the distributed HA 12 that retains the Binding Cache.

Using the relevant drawing, a preferred Embodiment 4 of the present invention will be described.

Embodiment 4 is characterized in that the HA 1 accommodates a plurality of home networks and the described Embodiments 1 through 3 can be implemented in the configuration of Embodiment 4.

Figure 29:
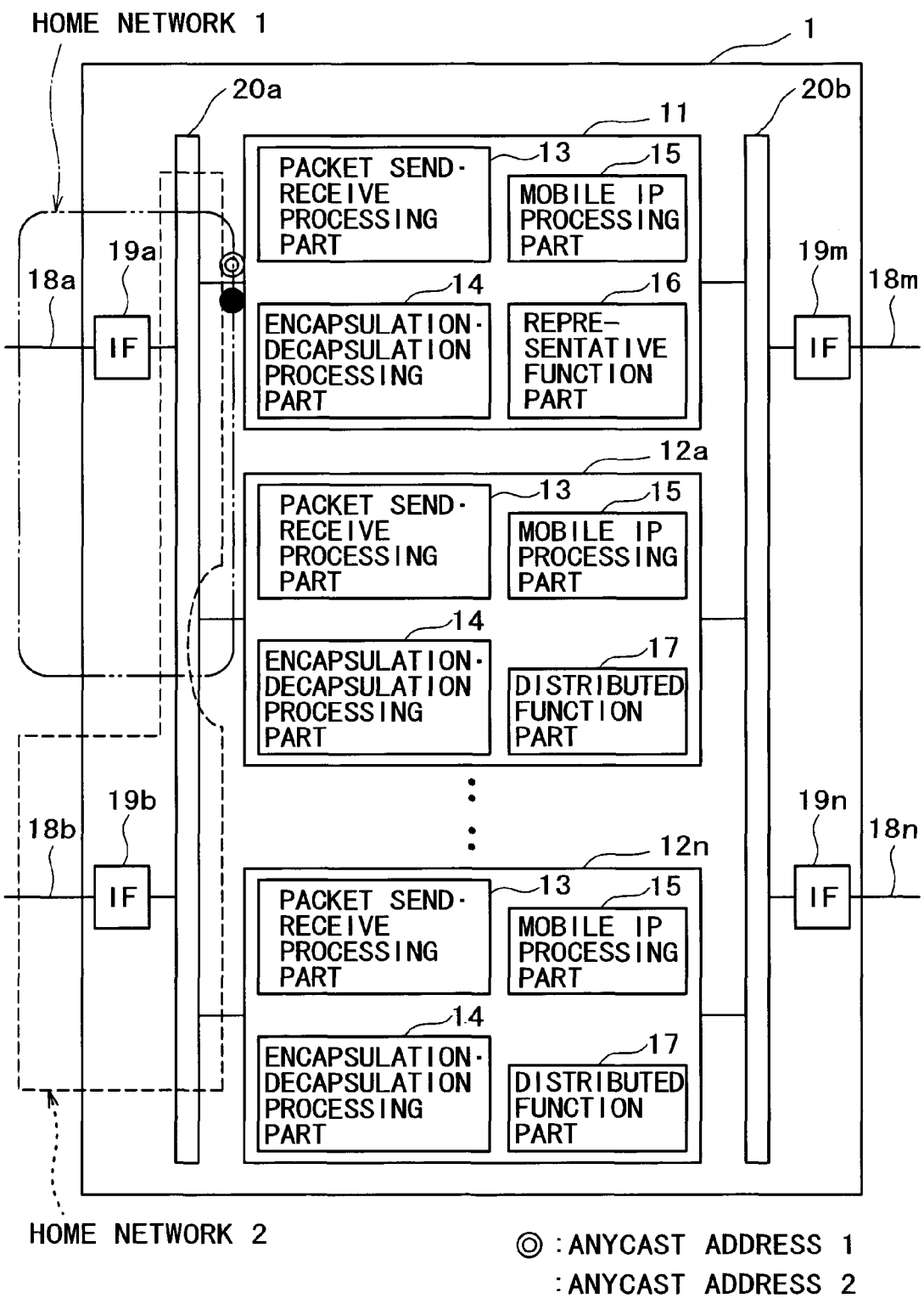
FIG. 29 is a block diagram of an HA 1 in accordance with a preferred Embodiment 4 of the invention.

FIG. 29 shows an example of the HA 1 configuration of Embodiment 4. The HA 1 accommodates one or more home networks. To the interface of the representative HA 11 with the router 2, one or more Mobile IPv6 Home-Agents Anycast Addresses are assigned.

One or more distributed HAs 12 form a single home network. Alternatively, a single distributed HA 12 accommodates one or more home networks.

According to Embodiment 4, the HA 1 consists of a representative HA and distributed HAs and, by assigning one or more Mobile IPv6 Home-Agents Anycast Addresses to the interface of the representative HA, the load on the HA 1 can be shared even when the HA 1 accommodates a plurality of home networks. Because the HA 1 is able to accommodate one or more home networks, the system expandability is enhanced.

Using the relevant drawing, a preferred Embodiment 5 of the present invention will be described.

Embodiment 5 is characterized in that the HA 1 accommodates a plurality of home networks and the described Embodiments 1 through 3 can be implemented in the configuration of Embodiment 5.

Figure 30:
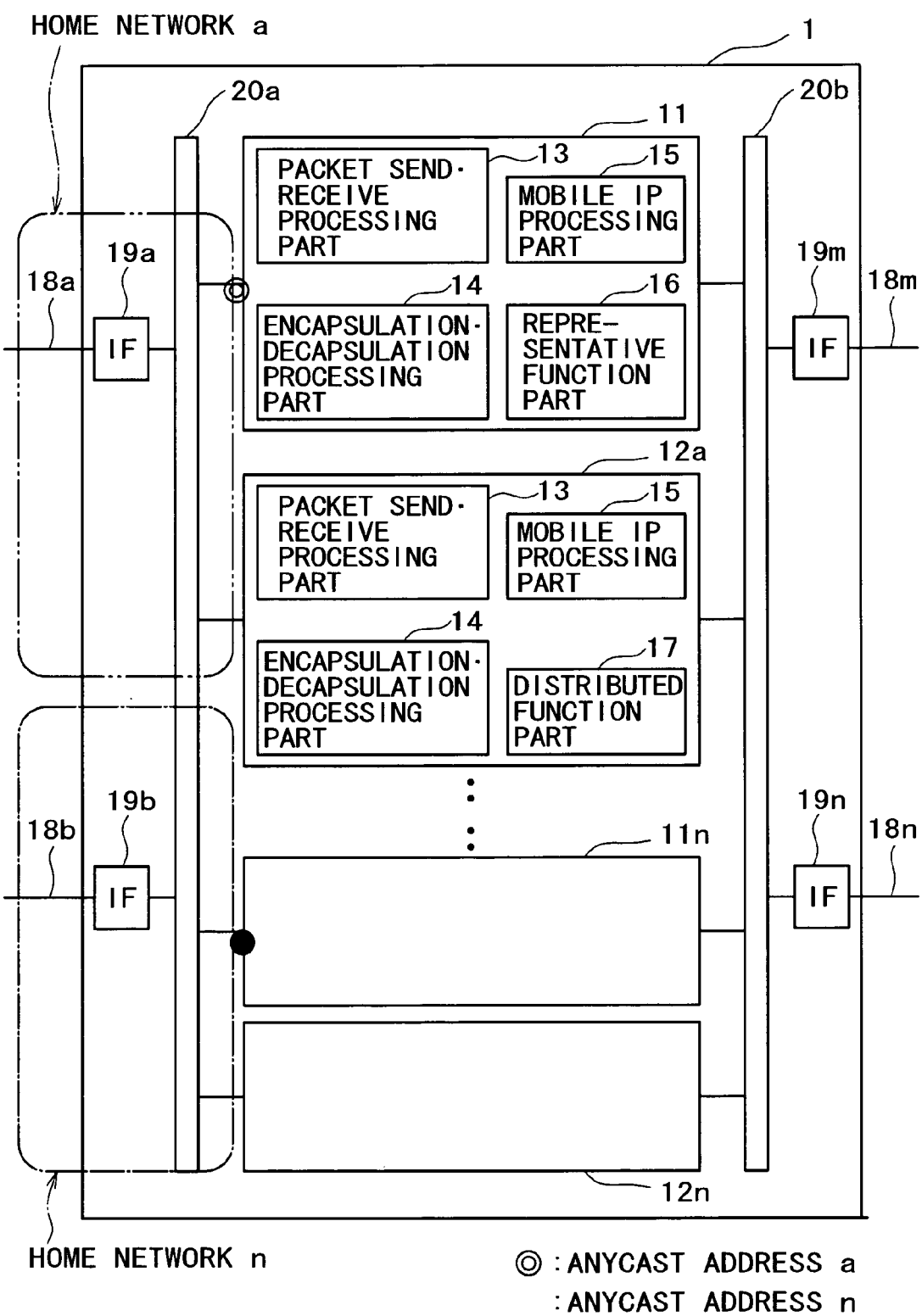
FIG. 30 is a block diagram of an HA 1 in accordance with a preferred Embodiment 5 of the invention.

FIG. 30 shows an example of the HA 1 configuration of Embodiment 5. The HA 1 accommodates one or more home networks. Each home network comprises a single representative HA and one or more distributed HAs. To the interface of a representative HA 11 (11a, 11n) with the router 2, a Mobile IPv6 Home-Agents Anycast Address including the subnet prefix of the home network is assigned.

According to Embodiment 5, when the HA 1 accommodates a plurality of home networks, each home network comprises a representative HA and distributed HAs and, by assigning a Mobile IPv6 Home-Agents Anycast Addresses to the interface of the representative HA, the load can be shared by the distributed HAs in each home network. Because the HA 1 is able to accommodate one or more home networks, the system expandability is enhanced.

A preferred Embodiment 6 of the present invention will be described.

Embodiment 6 is characterized in that one server accommodates a single home network and the described Embodiments 1 through 3 can be implemented in the configuration of Embodiment 6.

To the interface of each server with the router 2, a Mobile IPv6 Home-Agents Anycast Address including the subnet prefix of the home network is assigned. Each server is provided with a representative function 16 and distributed functions 17.

According to Embodiment 6, the HA 1 accommodates a plurality of home networks and each server is deployed for a single home network. By assigning a Mobile IPv6 Home-Agents Anycast Address including the subnet prefix of the home network to the interface of each server, the HA 1 can accommodate one or more home networks and the system expandability is enhanced.

Using the relevant drawing, a preferred Embodiment 7 of the present invention will be described.

Figure 31:
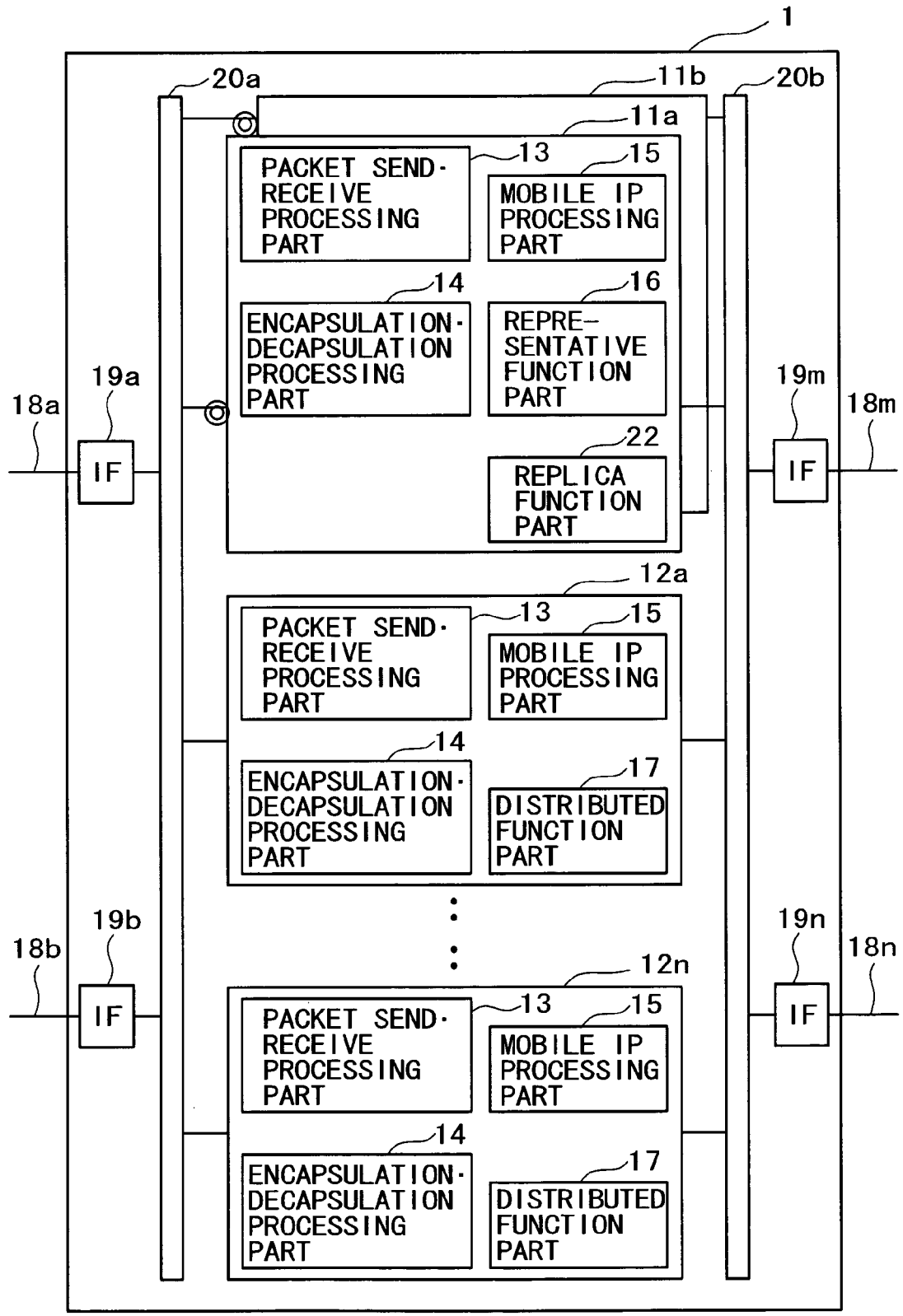
FIG. 31 is a block diagram of an HA 1 in accordance with a preferred Embodiment 7 of the invention.

FIG. 31 shows an example of the HA 1 configuration of Embodiment 7. The HA 1 accommodates at least one home network. The representative HA 11 is duplicated. In the present embodiment, a representative HA 11a is active and a representative HA 11b is on standby.

Embodiment 7 is characterized in that the representative function part 16 is provided with a replica function part 22. The replica function part 22 has a function to copy the table information retained by the Mobile IP processing part 15 and representative function part 16 from the active HA to the standby HA.

To the interface of the active representative HA 11a, a Mobile IPv6 Home-Agents Anycast Address is assigned. When switching from the active HA to the standby HA occurs, the IP address of the interface of the active representative HA 11a is reassigned to the interface of the standby representative HA 11b.

According to Embodiment 7, the representative HA 11 of the HA 1 is duplicated and devices for copying the data from the active HA to the standby HA and vice versa are provided, and the Mobile IPv6 Home-Agents Anycast Address assigned to the interface of the active HA is reassigned to the standby HA when switching from the active to the standby occurs, and, consequently, the reliability of the HA 1 can be enhanced.

System and Method Implementation

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical disks, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, collecting attribute and load information from the second information processing equipment, storing information corresponding to an address acquired by terminal equipment in a second network compliant with the protocol and to an address assigned to terminal

What is claimed is:

1. A server in a first network compliant with a protocol, the server comprising:
 a first information processing equipment including a representative function and an interface having an address indicating a group of interfaces;
 a second information processing equipment without the representative function, wherein the first information processing equipment further includes a collecting device configured to collect attribute and load information from the second information processing equipment, wherein the second information processing equipment includes a storing device configured to store information corresponding to an address acquired by terminal equipment in a second network compliant with the protocol and to an address assigned to terminal equipment in the first network, wherein the first information processing equipment further includes a listing device configured to generate list information from the attribute and load information collected from the second information processing equipment and a sending device configured to send the list information the terminal equipment when the server receives a message addressed to the address indicating the group of interfaces.

2. The server of claim 1, wherein the protocol is an IPv6 protocol and the server is a Mobile IPv6 Home Agent.

3. The server of claim 2, wherein the address indicating the group of interfaces is a Mobile IPv6 Home-Agents Anycast Address, the message addressed to the address indicating the group of interfaces is a Home Agent Address Discovery Request message, and the attribute information collected from the second information processing equipment by the first information processing equipment is Home Agent related information.

4. The server of claim 1, wherein the first information processing equipment further includes:
 a storing device configured to store a set of entries including a source address of a message addressed to the address indicating the group of interfaces and list information sent to the source address; and
 a referring device configured to refer to the set of entries when the first information processing equipment receives a message addressed to the address indicating the group of interfaces, wherein when the source address of the message addressed to the address indicating the group of interfaces exists in a storage area storing the set of entries, the first information processing equipment is further configured to read the list information from the storage area and to send the list information to a sender of the message.

5. The server of claim 1, wherein the first information processing first equipment further includes:
 a retrieving device configured to get address corresponding information from the information processing second equipment;
 a storing device configured to store a set of entries including the address corresponding information and the address of the second information processing equipment; and
 a referring device configured refer to the set of entries when the information processing first equipment receives a message addressed to the address indicating the group of interfaces, wherein when the source address of the message addressed to the address indicating the group of interfaces exists in a storage area storing the set of entries, the information processing first equipment is further configured to read the information for the second information processing equipment from the storage area and to send the information for the second information processing equipment to the sender of the message.

6. The server of claim 1, wherein the server accommodates at least one home network as a mobile communication network, and the first information processing equipment further includes a representative function for the at least one home network.

7. The server of claim 1, wherein the server is configured to accommodate at least one home network as a mobile communication network, wherein each home network is provided with the first information processing equipment and the second information processing second equipment.

8. The server of claim 1, further comprising another first information processing equipment configured like the first information processing equipment, wherein the first information processing equipment is configured to copy information stored in the first information processing equipment to the other first information processing equipment.

9. A method for mobile communication for a server in a first network compliant with a protocol, wherein the server includes a first information processing equipment with a function and a second information processing equipment without the function, wherein the first information processing equipment includes an interface having an address indicating a group of interfaces, the method comprising:
collecting attribute and load information from the second information processing equipment;
storing information corresponding to an address acquired by terminal equipment in a second network compliant with the protocol and to an address assigned to terminal equipment in the first network;
generating list information from the attribute and load information collected from the second information processing equipment;
receiving a message addressed to the address indicating the group of interfaces; and
sending the list information.

10. The method of claim 9, wherein the protocol is an IPv6 protocol and the server apparatus is a Mobile IPv6 Home Agent.

11. The method of claim 10, wherein the address indicating the group of interfaces is a Mobile IPv6 Home-Agents Anycast Address, the message addressed to the address indicating the group of interfaces is a Home Agent Address Discovery Request message, and the attribute information collected from the information processing second equipment by the information processing first equipment is Home Agent related information.

12. The method of claim 9, further comprising:
storing a set of entries including a source address of a message addressed to the address indicating the group of interfaces and list information sent to the source address; and
referring to the set of entries when the first information processing equipment receives a message addressed to the address indicating the group of interfaces;
when the source address of the message addressed to the address indicating the group of interfaces exists in a storage area storing the set of entries, reading the list information from the storage area and sending the list information to a sender of the message.

13. The method of claim 9, further comprising:
getting address corresponding information from the information processing second equipment;
storing a set of entries including the address corresponding information and the address of the second information processing equipment; and
referring to the set of entries when the information processing first equipment receives a message addressed to the address indicating the group of interfaces;
when the source address of the message addressed to the address indicating the group of interfaces exists in a storage area storing the set of entries, reading the information for the second information processing equipment from the storage area and sending the information for the second information processing equipment to the sender of the message.

14. A computer-readable medium carrying one or more sequences of one or more instructions for mobile communication for a server in a first network compliant with a protocol, wherein the server includes a first information processing equipment with a function and a second information processing equipment without the function, wherein the first information processing equipment includes an interface having an address indicating a group of interfaces, the one or more sequences of one or more instructions including instructions which, when executed by one or more processors, cause the one or more processors to perform the steps of:
collecting attribute and load information from the second information processing equipment;
storing information corresponding to an address acquired by terminal equipment in a second network compliant with the protocol and to an address assigned to terminal equipment in the first network;
generating list information from the attribute and load information collected from the second information processing equipment;
receiving a message addressed to the address indicating the group of interfaces; and
sending the list information.

* * * * *